United States Patent
Koshi et al.

(10) Patent No.: US 6,792,157 B1
(45) Date of Patent: Sep. 14, 2004

(54) IMAGE ENCODING APPARATUS AND QUANTIZATION CHARACTERISTICS DETERMINING APPARATUS

(75) Inventors: Yutaka Koshi, Nakai-machi (JP); Shinji Shishido, Nakai-machi (JP); Ikken So, Nakai-machi (JP); Masanori Sekino, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 650 days.

(21) Appl. No.: 09/643,883

(22) Filed: Aug. 23, 2000

(30) Foreign Application Priority Data

Aug. 25, 1999 (JP) .......................................... 11-237857
Apr. 28, 2000 (JP) ...................................... 2000-130540

(51) Int. Cl.[7] .............................. G06K 9/36; G06K 9/38; G06K 9/46
(52) U.S. Cl. ...................... 382/251; 382/245; 382/246; 382/247; 341/106; 358/426.14; 375/240.03; 375/240.23
(58) Field of Search ........................ 382/248, 251–253, 382/166, 232, 237–239, 244–247; 375/240.22–240.24, 240.03; 348/568; 358/426.01–426.16; 341/50, 51, 106, 107

(56) References Cited

U.S. PATENT DOCUMENTS

| | | | |
|---|---|---|---|
| 5,638,126 A | * | 6/1997 | Lim ...................... 375/240.03 |
| 5,701,367 A | * | 12/1997 | Koshi et al. ................. 382/239 |
| 5,907,637 A | * | 5/1999 | Murashita et al. .......... 382/239 |
| 5,907,638 A | * | 5/1999 | Onodera ..................... 382/239 |
| 5,929,912 A | * | 7/1999 | Aono et al. ............ 375/240.11 |
| 6,009,206 A | * | 12/1999 | Acharya ..................... 382/251 |
| 6,021,227 A | * | 2/2000 | Sapiro et al. ................ 382/239 |
| 6,040,861 A | * | 3/2000 | Boroczky et al. ....... 375/240.12 |
| 6,181,825 B1 | * | 1/2001 | Ragland et al. ............. 382/239 |
| 6,208,689 B1 | * | 3/2001 | Ohira et al. ........... 375/240.12 |
| 6,208,761 B1 | * | 3/2001 | Passaggio et al. .......... 382/237 |
| 6,233,355 B1 | * | 5/2001 | Kajiwara .................... 382/238 |
| 6,415,059 B1 | * | 7/2002 | Saunders .................... 382/239 |
| 6,553,143 B2 | * | 4/2003 | Miyake et al. .............. 382/239 |

FOREIGN PATENT DOCUMENTS

JP        8-2083        1/1996

OTHER PUBLICATIONS

Robert G. Gallager, "Variations on a Theme by Huffman," IEEE Trans. Information Theory, vol. IT–24, No. 6, Nov. 1978, pp. 668–674.*

* cited by examiner

Primary Examiner—Bhavesh M. Mehta
Assistant Examiner—Yubin Hung
(74) Attorney, Agent, or Firm—Morgan Lewis & Bockius LLP

(57) ABSTRACT

Images are to be efficiently and easily encoded while suppressing block distortion and pseudo-contour generation. A quantization characteristics determining unit receives pixel values from a pixel value input unit, measures the length S of the consecutive occurrence of the same pixel values in connection with a pixel to be encoded and the pixel value differences D, and determines quantization characteristics n with reference to the result of sensory evaluation. A quantization/inverse quantization unit quantizes pixel values to be inputted with the quantization characteristics n, and further inverse quantizes them to reduce the number of gray-scale levels. The output pixel values of the quantization/inverse quantization unit are encoded and outputted by an entropy encoding unit.

11 Claims, 19 Drawing Sheets

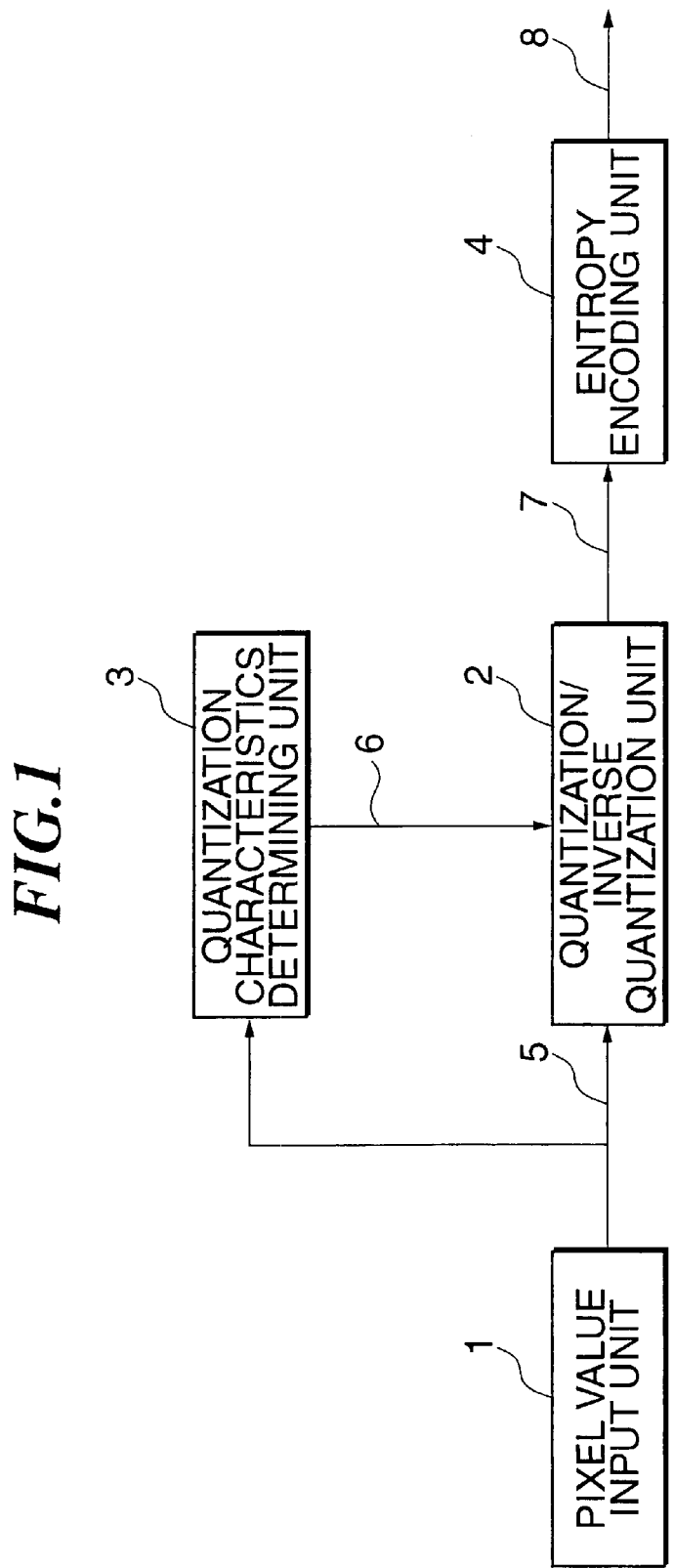

|   |    | S       |         |         |         |
|---|----|---------|---------|---------|---------|
|   |    | 1       | 2       | 4       | 8       |
| D | 2  | ABSENT  | ABSENT  | ABSENT  | PRESENT |
|   | 4  | ABSENT  | ABSENT  | PRESENT | PRESENT |
|   | 8  | ABSENT  | ABSENT  | PRESENT | PRESENT |
|   | 16 | ABSENT  | PRESENT | PRESENT | PRESENT |

FIG.14

| c | b | d |
|---|---|---|
| a | x |   |

FIG.15

| REPRESENTATIVE QUANTIZATION VALUE, n = 2 | REPRESENTATIVE QUANTIZATION VALUE, n = 3 | SYNTHESIZED REPRESENTATIVE QUANTIZATION VALUE |
|---|---|---|
| 0000 | 0000 | 0000 |
| 0101 | 0010 | 0010 |
| 1010 | 0100 | 0100 |
| 1111 | 0110 | 0101 |
|  | 1001 | 0110 |
|  | 1011 | 1001 |
|  | 1101 | 1010 |
|  | 1111 | 1011 |
|  |  | 1101 |
|  |  | 1111 |

| $X_{-1,-1}$ | $X_{0,-1}$ | $X_{1,-1}$ |
|---|---|---|
| $X_{-1,0}$ | $X_{0,0}$ | $X_{1,0}$ |
| $X_{-1,1}$ | $X_{0,1}$ | $X_{1,1}$ |

| 1 | 2 | 1 |
|---|---|---|
| 2 | 4 | 2 |
| 1 | 2 | 1 |

IMAGE ENCODING APPARATUS AND QUANTIZATION CHARACTERISTICS DETERMINING APPARATUS

BACKGROUND OF THE INVENTION

1. Field of the Invention

The present invention relates to technology for encoding image data.

2. Description of the Related Art

First, encoding systems according to the prior art will be considered.

1. JPEG System

Known image data encoding systems include the Joint Photographic Coding Experts Group (JPEG), which is an international standard system. The JPEG system, as it is designed for mounting in a hardware form, takes a long processing time if executed on a software basis. The encoding process of the JPEG system is outlined below.

(1) Pixel value data are cut out in blocks each having eight pixels by eight lines from image data entered in the order of raster scanning;
(2) Pixel values in each cut-out block are subjected to discrete cosign transform (DCT);
(3) The resultant transform coefficient is subjected to linear quantization; and
(4) The resultant quantization index is subjected to Huffman's encoding.

Among these steps, the quantity of computation is particularly large for DCT. DCT can be accomplished by multiplying twice eight rows by eight columns. Therefore 16 rounds of product addition are needed per pixel.

Generally speaking, an irreversible encoding system is a technique to reduce the quantity of data without inviting visual deterioration in image quality by removing unnecessary redundant components in the reproduction of images. Redundant components can be broadly classified into redundancy in resolution and redundancy in gray-scale. The JPEG system achieves a high encoding efficiency by addressing both types of redundancy in combination.

In order to remove redundant components in resolution, relatively heavy processing loads are required, such as frequency conversion and space filtering. On the other hand, removal of redundant components in gray-scale requires only relatively light processing loads, such as quantization and discarding of lower-order bits. If an irreversible encoding system for removing only redundant components in gray-scale, the system can be expected to take no long processing time even if executed on a software basis.

2. BTC System

Systems focusing on redundant components in gray-scale include the block truncation coding (BTC) systems. One example is the BTC system disclosed in the Japanese Published Examined Patent Application NO. 8-2083. The process of encoding by the BTC system is outlined below.

(1) Pixel value data are cut out in blocks each having four pixels by four lines from image data entered in the order of raster scanning;
(2) The difference between the maximum and minimum values (dynamic range) is computed for the pixel values of each cut-out block;
(3) Blocks whose dynamic ranges are not broader than a predetermined first threshold are subjected to one-level quantization;
(4) Blocks whose dynamic ranges are broader than a predetermined second threshold are subjected to four-level quantization;
(5) All other blocks are subjected to two-level quantization;
(6) The quantization characteristics at each level are computation according to the pixel value of each block; and
(7) The computed quantization characteristics and quantization index are subjected to entropy encoding.

The BTC system is subject to less processing loads than the JPEG system, but it is liable to give rise to the following problems.

First, since the number of gray-scale levels for quantization is switched block by block, the blocks are susceptible to distortion. For instance, an input image whose density profile is shown in FIG. 18 is considered. In the figure, the horizontal axis represents the positions of pixels, and the vertical axis and pixel values. This input image, when subjected to BTC encoding and BTC decoding, is turned into an output image whose density profile is shown in FIG. 19. In this process, a level difference in pixel value arises on the boundary between blocks of 1 to 4 in pixel position including an edge and blocks of 5 to 8 in pixel position including no edge. In such a case, because of the characteristics of human vision, even a slight level difference is likely to be detected as a block-shaped distortion.

Second, there is an overhead for encoding and transmitting the quantization characteristics. The quantization characteristics have the number of quantization levels, the reference level and the level intervals. Where the gray-scale accuracy of input pixels is 8 [bits/pixel], the original data quantity of additional information is 1.6+8+8=17.6 [bits]. If the compression ratio of entropy encoding is 2, the quantity of additional information will be 8.8 [bits]. Since the data quantity of a block is 16 [Bytes], the ratio of the additional information will be about $1/14.5$. The smaller the block size, the less likely the block distortion to occur, but this would mean a greater ratio of the additional information, and there is a practical limit to block size reduction.

Third, determining quantization characteristics block by block entails heavy processing loads. In order to determine quantization characteristics, the largest pixel value and the smallest pixel value in each block are found out. Further, to compute the reference level and the level intervals, the average of pixel values in each block are figured out. In particular where four-level quantization is chosen, division by three is required. Of these loads, that of calculating the largest and smallest values is especially heavy.

Fourth, the BTC system involves complex encoding and decoding units. The BTC system, as illustrated in FIG. 20, encodes quantization indexes computed block by block, put together into pages, and represented on a bit plane basis by a reversible binary encoding system, for instance the Modified Read (MMR) system, which is an international standard system. On the other hand, the additional information indicating the quantization characteristics is variable-length encoded block by block.

Since two different ways of processing, block processing and bit plane processing, are needed, the overall configuration of the system is made complex. To add, in FIG. 20, reference numeral 91 denotes a blocking unit; 93, a quantization unit; 94, a paging unit; 95, a binary encoding unit; and 96, a variable length encoding unit.

An overall approach according to the present invention will be described below.

1. Improvement of the BTC System

The challenge is to obtain an irreversible image encoding apparatus which is susceptible to less processing loads than the JPEG system, free from block distortion which the BTC system entails and can be realized in a simpler configuration than the BTC system.

An encoding system to obviate the shortcomings of the BTC system will be discussed below. First, quantization characteristics are switched pixel by pixel without blocking. Second, to dispense with the transmission of quantization characteristics as additional information, inverse quantized pixel values, i.e. pixel values whose number of gray-scale levels is limited, are encoded instead of encoding the quantization index. Third, in order to alleviate the load of determining the quantization characteristics, only pseudo-contours are taken note of.

2. Restrainng of Pseudo-contours

This system, since it involves the restriction of the number of gray-scale levels but no blocking, is free from block distortion. Only pseudo-contours need to be taken note of as a distortion attributable to encoding. The biggest challenge here is to work out a technique by which quantization can be carried out with the smallest possible number of gray-scale levels while restraining the generation of pseudo-contours.

The ease of pseudo-contour generation varies with the image pattern. For instance, in the part of an image pattern having edges, distortion is unlikely to be detected even if there is some quantization error. In contrast, in a uniform gray-scale part with little noise, even a slight quantization error is likely to be detected as a pseudo-contour. Even in the same gray-scale part, a high noise level would have an effect to mask the pseudo-contour. Based on these facts, a model is supposed in which large areas where there are consecutive similar pixel values adjoin each other and a pseudo-contour is detected when a gray-scale level gap occurs on any boundary between such areas. Next, as an image pattern most susceptible to the generation of a pseudo-contour (stress pattern), a succession of uniform stripes gradually varying in pixel value from one to next is supposed. As the parameters representing the characteristics of the stress pattern, the width S of each stripe and the difference D in pixel value between stripes are chosen. Furthermore, for various combinations of S and D, the range in which no pseudo-contour can be detected is found out by a sensory evaluation test. Results such as what are shown in FIG. 11, for example, can be obtained. Entries "PRESENT" in FIG. 11 mean that a pseudo-contour is present between matched S and D. By matching the pattern of each part of the input image with the stress pattern and measuring the parameters S and D, the extent of pseudo-contour generation can be predicted. In this process, the closer the pattern of the input image to the stress pattern, the higher the accuracy of prediction, and the less close, the higher the predictable level of generation. However, from the viewpoint of preventing pseudo-contour generation, these are welcome characteristics because any prediction error that may arise is on the safe side.

3. Entropy Encoding of Gray-scale-restricted Images

In the above-described adaptive quantization on a pixel-by-pixel basis while restraining the generation of pseudo-contours, transmitting the quantization index and quantization characteristics for each individual pixel would result in too low an efficiency of encoding. In view of this, now is considered an alternative way whereby pixel values restricted in the number of gray-scale levels by quantization or inverse quantization are directly transmitted.

The challenge here is to find out an efficient way to carry out entropy encoding of gray-scale-restricted image data. Obviously, the probability of the emergence of exactly the same pixel value is higher with gray-scale-restricted image data than with ordinary image data. Therefore, the conventional predictive encoding system can be usefully applied. For instance, according to the JPEG independent system, which is an international standard system, an already encoded pixel a adjacent to a pixel x to be encoded is referenced, and the pixel value difference between the referenced pixel a and the pixel x to be encoded, i.e. the prediction error $e=(x-a)$, is subjected to Huffman's encoding. Since restriction of gray-scale levels increases the probability for the same pixel values to adjoin each other, the frequency of a 0 difference in pixel value rises, resulting in an enhanced efficiency of encoding.

However, this method will have no effect unless the same pixel values are positioned in the range of pixels to be referenced in prediction. The reference range of predictive encoding, constrained by the hardware dimensions and the quantity of arithmetic operation, is in the order of only a few pixels.

Yet, in actual image data, similar pixel values are often sporadically positioned in repetition in a much wider range. For instance, in an image of blue sky, the same blue color appears between clouds. Therefore, by registering in a dictionary pixel values that have emerged in the past and, when any entry in the dictionary is hit, encoding that dictionary index, the efficiency of encoding can be improved.

Further, if the conventional predictive encoding system is applied to a gray-scale-restricted image, the number of gray-scale levels which a pixel value, predicted by a prediction formula, can take will increase. For instance, it is now supposed that the number of gray-scale levels of an image which originally has 256 gray-scale values is restricted to 64 gray-scale levels. By predictive encoding, if a predicted value $\underline{x}$ is computed by the prediction formula $\underline{x}=(a+b)/2$ from a pixel b immediately above the pixel to be encoded x and the pixel a immediately to its left, the values the predicable value $\underline{x}$ will prove greater than 64 gray-scale levels, sometimes a value impossible from the outset, Then there will be more kinds of values than the prediction error $e=(x-\underline{x})$ can take, resulting in no better encoding efficiency. By restricting the gray-scale levels of the result of computing the prediction formula as well, the number of values the prediction error can take decreases, and the encoding efficiency can be enhanced accordingly.

SUMMARY OF THE INVENTION

In view of the problems noted above, the present invention provides a quantization characteristics determining apparatus having a unit that selects the values of pixels peripheral to a pixel to be encoded out of input pixel values and to output them; a unit that quantizes and inverse quantizes the values of the peripheral pixels according to preset quantization characteristics; a unit that measures the length S of the consecutive occurrence of the same pixel values from the inverse quantized pixel values and/or the pixel value differences D between the pixel to be encoded and the peripheral pixels; and a unit that determines quantization characteristics from the measured length S and/or the pixel value differences D.

This configuration makes it possible to readily determine the quantization characteristics, which give yardsticks for avoiding image quality deterioration by pseudo-contours, from the length S and the pixel value differences D.

In this configuration, the input pixel values may as well be preprocessed by a low-pass filter.

Alternatively, the relationship of a length S and/or the values of pixel value differences D, both figured out in advance by a sensory evaluation test, to the frequency of pseudo-contour generation may be held, and the quantization characteristics may be determined from the relative magnitude or magnitudes of the measured length S and/or the values of pixel value differences D.

Further in view of the above-noted problems, the invention provides an image encoding apparatus having a unit that inputs pixel values; a unit that determines quantization characteristics on a pixel-by-pixel basis according to the characteristics of the input pixel values; a unit that quantizes or inverse quantizes the values of the input pixel values according to the determined quantization characteristics; and a unit that subjects image data gray scale-restricted by quantization or inverse quantization to entropy encoding.

This configuration restricts the gray-scale levels by quantization or inverse quantization, and the number of gray-scale levels of image data (the number of kinds of pixel values) is thereby reduced. Accordingly, the image data can be encoded at a high efficiency by entropy encoding.

Further in this configuration, the entropy encoding unit may be provided with a unit that selects the values of reference pixels peripheral to a pixel to be encoded out of gray-scale-restricted pixel values and to output them; a unit that computes the predicted value of the pixel to be encoded from the values of the reference pixels on the basis of a prediction formula, and to compute as a prediction error any difference between the pixel value of the pixel to be encoded and its predicted value; and a variable-length encoding unit that subjects the prediction error to variable-length encoding and to output the resultant code.

Alternatively, the entropy encoding unit may be provided with a unit that selects the values of reference pixels peripheral to a pixel to be encoded out of gray-scale-restricted pixel values and to output them; a unit that computes the predicted value of the pixel to be encoded from the values of the reference pixels on the basis of a prediction formula, and to compute as a prediction error any difference between the pixel value of the pixel to be encoded and its predicted value; a dictionary encoding unit that stores gray-scale-restricted pixel values in a dictionary, to output, if the pixel value of the pixel to be encoded hits any entry in the dictionary, that dictionary index, or to output, if no entry is hit, identifying information indicating the failure to hit and to update the dictionary appropriately; a selecting unit that selects the dictionary index if any entry in the dictionary is hit or, if no entry is hit, to select and output the prediction error; and a variable-length encoding unit that subjects the prediction error to variable-length encoding and to output the resultant code.

Or the prediction error computing unit may be provided with a prediction unit that computes the predicted value from the value of the reference pixel; a unit that quantizes or inverse quantizes the predicted value according to preset quantization characteristics; and a prediction error computing unit that computes difference between the quantized or inverse quantized predicted value and the pixel value of the pixel to be encoded.

Further, the quantization/inverse quantization unit may output as they are the data of the n higher-order bits of an m-bit pixel value as the quantization index, use as it is the quantization index as the data of the n higher-order bits of the inverse quantized value, cut out the higher-order data of higher-order m−n bits from the quantization index, and use them as the data of lower-order m−n bits of the inverse quantized value.

Also in view of the above-noted problems, the present invention provides an image encoding apparatus having a unit that inputs pixel values; a unit that determines characteristics of restricting the number of pixel values on a pixel-by-pixel basis according to the characteristics of the input pixel values; a unit that converts the input pixel values into output pixel values according to the determined characteristics of restricting the number of pixel values; and a unit that subjects image data restricted in the number of pixel values by the characteristics of restricting the number of pixel values to entropy encoding.

In this configuration as well, since the variety of pixel values before the entropy encoding is restricted, the efficiency of entropy encoding is enhanced. Any method to realize the pixel value number characteristics may be used only if it involves matching to reduce the number of elements of the pixel value set. The number of gray-scale levels may as well be reduced by quantization or inverse quantization processing or the like as described above. Thus, the unit that converts input pixel values into output pixel values may be a number of gray-scale levels restricting unit, such as a unit that carries out quantization or inverse quantization. Or else, the variety of output pixel values may as well be restricted by the use of two or more tables differing in the number of output elements. In this case, the unit that converts input pixel values into output pixel values serves as a tabulating unit for these tables. Multiple tables may also be prepared on the basis of the appearance frequency of pixel values in the whole image.

According to the invention, there is further provided a computer-readable recording medium recording a computer program for causing a computer to execute encoding, having: a step to generate data quantized according to a pixel to be encoded and pixels peripheral to it with preset quantization characteristics; a step to measure the length S of the consecutive occurrence, in the peripheral pixels, of the same data as the quantized data of the pixel to be encoded pixel values and/or the differences D between the pixel to be encoded and the peripheral pixels; a step to determine the quantization characteristics of the pixel to be encoded from the measured length S and/or the values of pixel value differences D; and a step to quantize the value of the pixel to be encoded according to the determined quantization characteristics.

BRIEF DESCRIPTION OF THE DRAWINGS

The above and other objects, features and advantages of the present invention will become more apparent from the following detailed description when taken in conjunction with the accompanying drawings wherein:

FIG. 1 is a block diagram providing a general view of a preferred embodiment of the invention;

FIG. 14 is a diagram for describing a form of realizing the windowing unit 53 of the entropy encoding unit 4 of FIG. 5;

FIG. 15 is a diagram for describing a form of realizing the quantization/inverse quantization unit 72 in the prediction error computing unit 52 of the entropy encoding unit 4 of FIG. 5;

DETAILED DESCRIPTION OF THE PREFERRED EMBODIMENTS

Figure 2A:
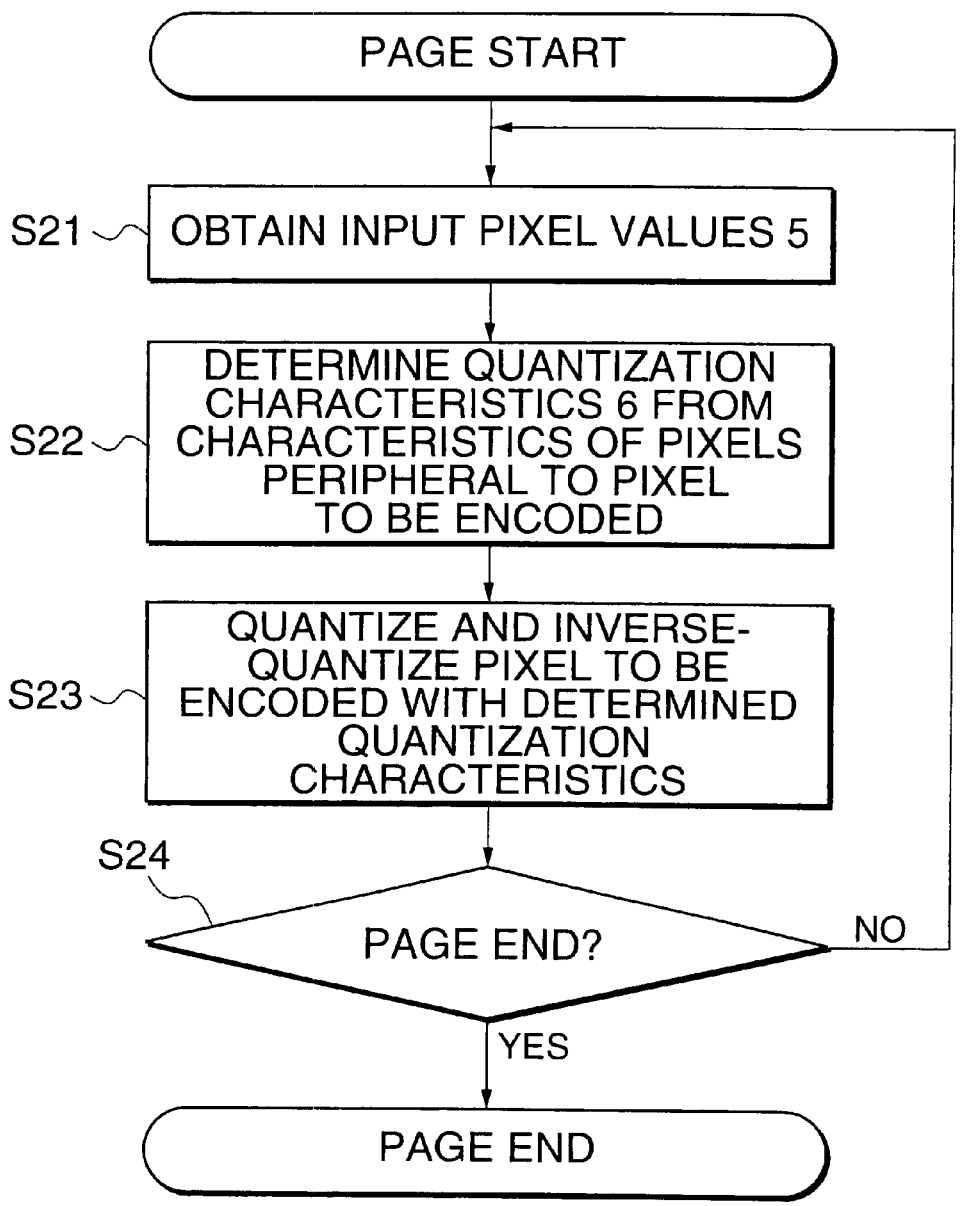
FIGS. 2A and 2B are flowcharts showing how the embodiment of FIG. 1 operates.

Preferred embodiments of the present invention will be described in detail below with reference to accompanying drawings.

FIG. 1 provides a general view of an encoding apparatus, which is a preferred embodiment of the invention, wherein the configuration of the encoding apparatus includes a pixel value input unit 1, a quantization/inverse quantization unit 2, a quantization characteristics determining unit 3 and an entropy encoding unit 4.

The pixel value input unit 1 is intended for entering pixel values 5. The quantization characteristics determining unit 3 determines quantization characteristics 6 on a pixel-by-pixel basis according to the characteristics of the entered pixel values 5. The quantization/inverse quantization unit 2 quantizes or inverse quantizes the input pixel value 5 according to the determined quantization characteristics 6. The entropy encoding unit 4 subjects image data 7 gray-scale-restricted by quantization or inverse quantization to entropy encoding.

Figure 2B:
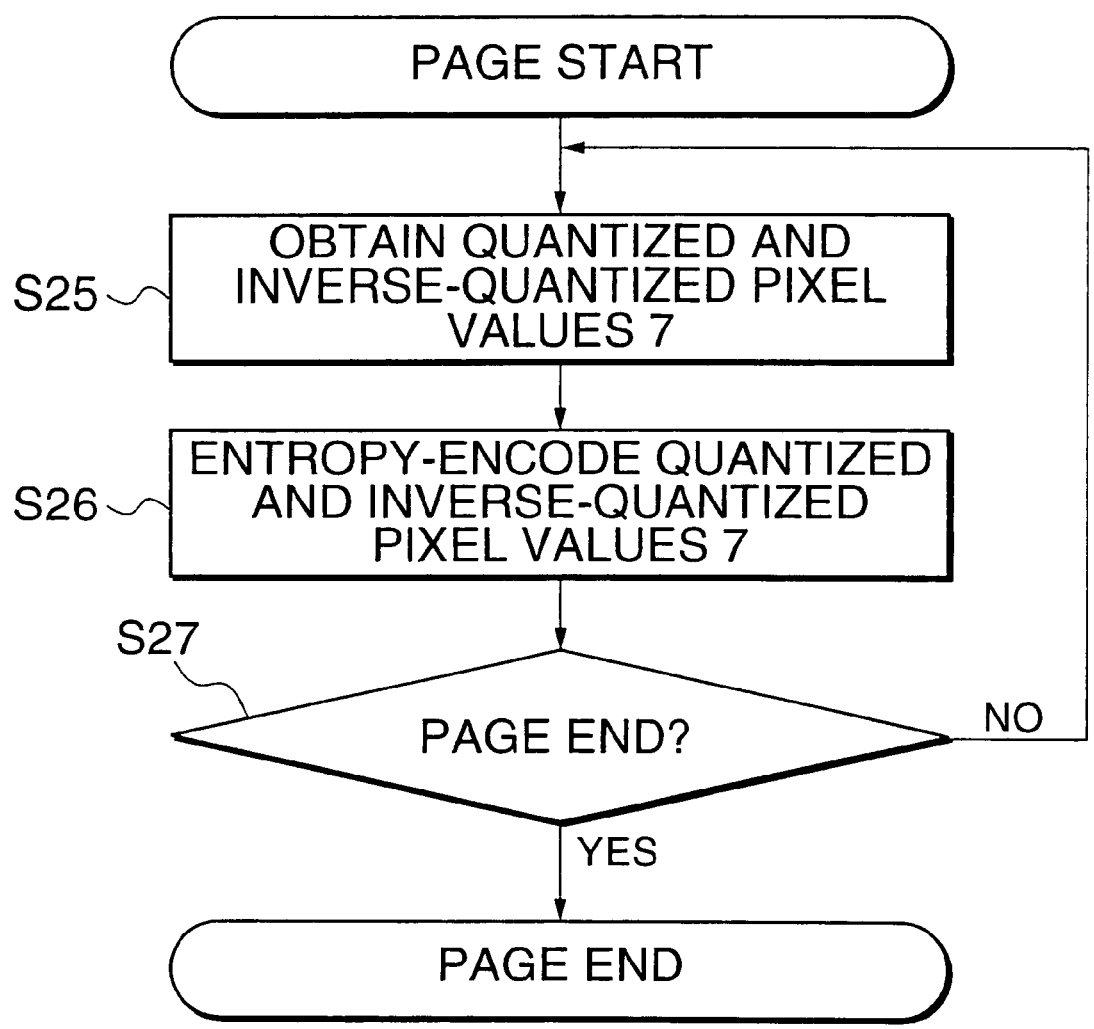

FIGS. 2A and 2B illustrate the operation of the quantization/inverse quantization unit 2, the quantization characteristics determining unit 3 and the entropy encoding unit 4. The quantization/inverse quantization unit 2 and the quantization characteristics determining unit 3 operate as described below.

[Step 21]: Receive input pixel values 5.

[Step 22]: Determine quantization characteristics 6 from the characteristics of pixels peripheral to the pixel to be encoded.

[Step 23]: Quantize and inverse quantize the pixel value of the pixel to be encoded according to the determined quantization characteristics.

[Step 24]: Repeat steps 21 through 23 until the page end.

The entropy encoding unit 4 operates as described below.

[Step 25]: Receives quantized or inverse quantized pixel values 7.

[Step 26]: Subjects the quantized or inverse quantized pixel values 7 to entropy encoding.

[Step 27]: Repeats steps 25 through 26 until the page end.

Figure 3:
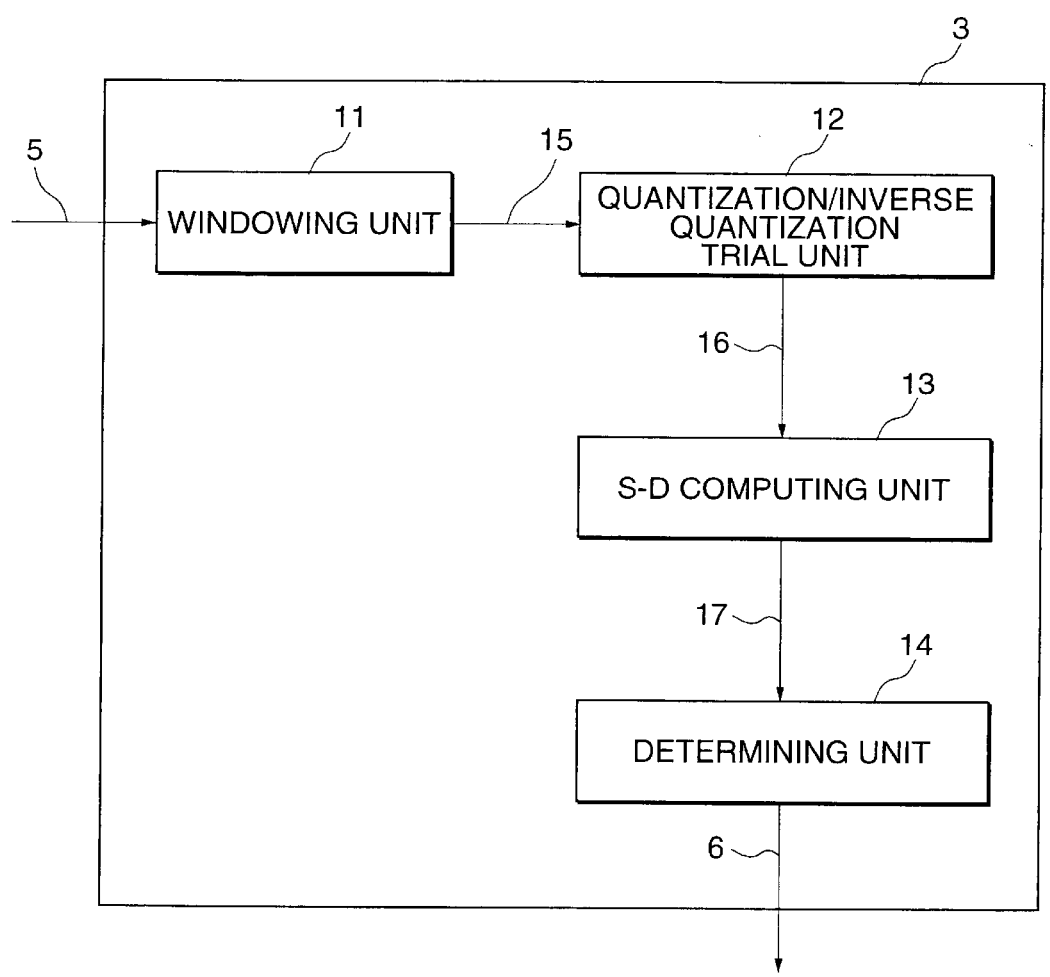
FIG. 3 is a block diagram illustrating the configuration of the quantization characteristics determining unit 3 in FIG. 1.

Next will be described the configuration of the quantization characteristics determining unit 3. FIG. 3 illustrates the configuration of the quantization characteristics determining unit 3. In the diagram, the quantization characteristics determining unit 3 includes a windowing unit 11, a quantization/inverse quantization trial unit 12, an S-D computing unit 13 and a determining unit 14. The windowing unit 11 holds more than one input pixel value 5, selects the values 15 of pixels peripheral to the pixel to be encoded out of the held pixel values, and outputs them. The quantization/inverse quantization trial unit 12 quantizes or inverse quantizes the values 15 of peripheral pixels according to preset quantization characteristics. The S-D computing unit 13 measures the length S of the consecutive occurrence of the same pixel values from the quantized or inverse quantized pixel values and the pixel value differences D between the pixel to be encoded and the peripheral pixels. The determining unit 14 determines the quantization characteristics 6 from the measured values 17 of S and D.

Figure 4:
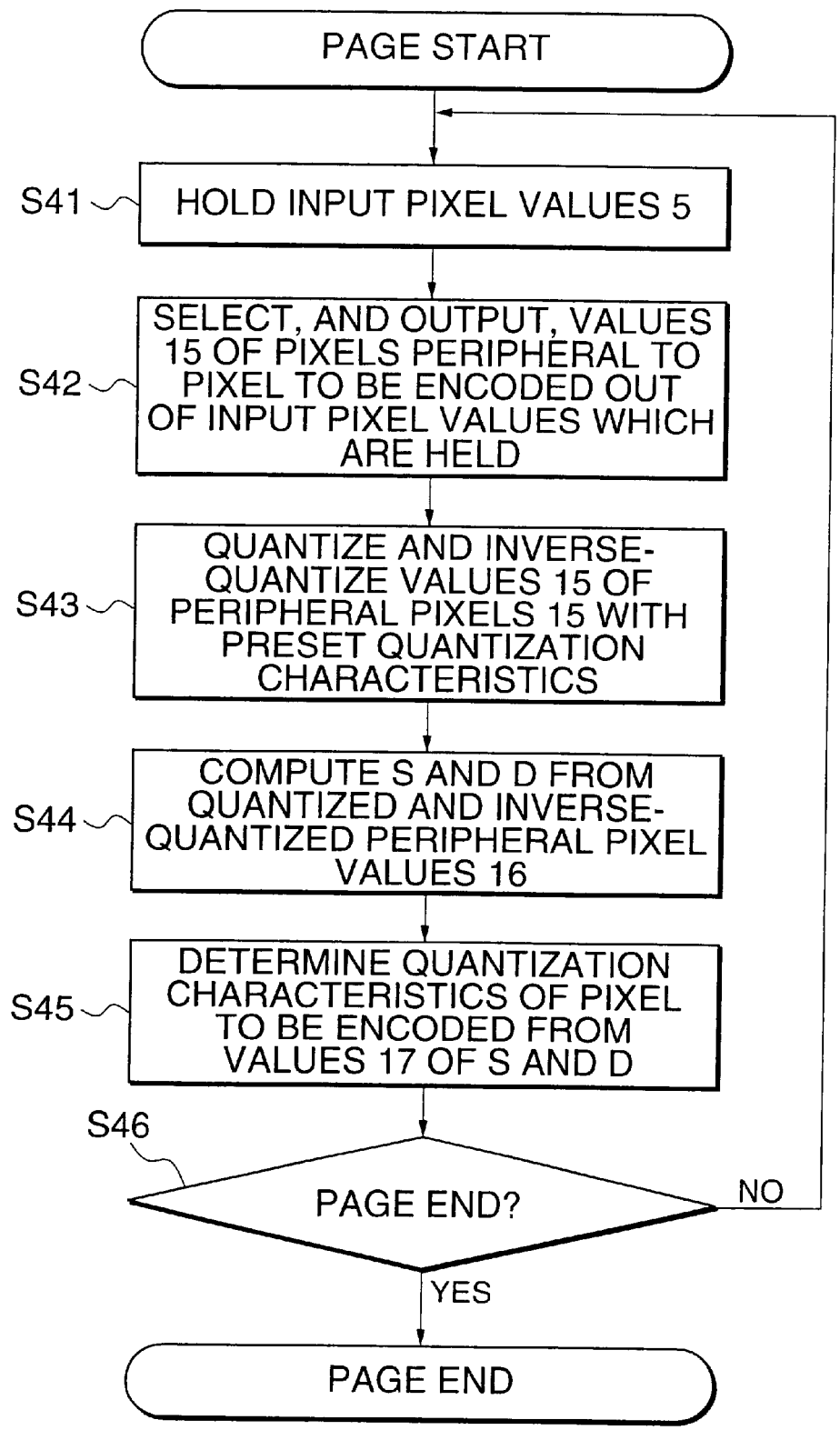
FIG. 4 is a flowchart showing how the quantization characteristics determining unit 3 of FIG. 1 operates.

FIG. 4 shows how the quantization characteristics determining unit 3 of FIG. 3 operates. Its operation is described below.

[Step 41]: Holds input pixel values.

[Step 42]: Selects the values 15 of pixels peripheral to the pixel to be encoded out of the held input pixel values, and outputs them.

[Step 43]: Quantizes or inverse quantizes the values 15 of peripheral pixels according to preset quantization characteristics.

[Step 44]: Computes S and D from the pixel values 16 of quantized or inverse quantized peripheral pixels.

[Step 45]: Determines the quantization characteristics of the pixel to be encoded from the values 17 of S and D.

[Step 46]: Repeats steps 41 through 46 until the page end.

Figure 8:
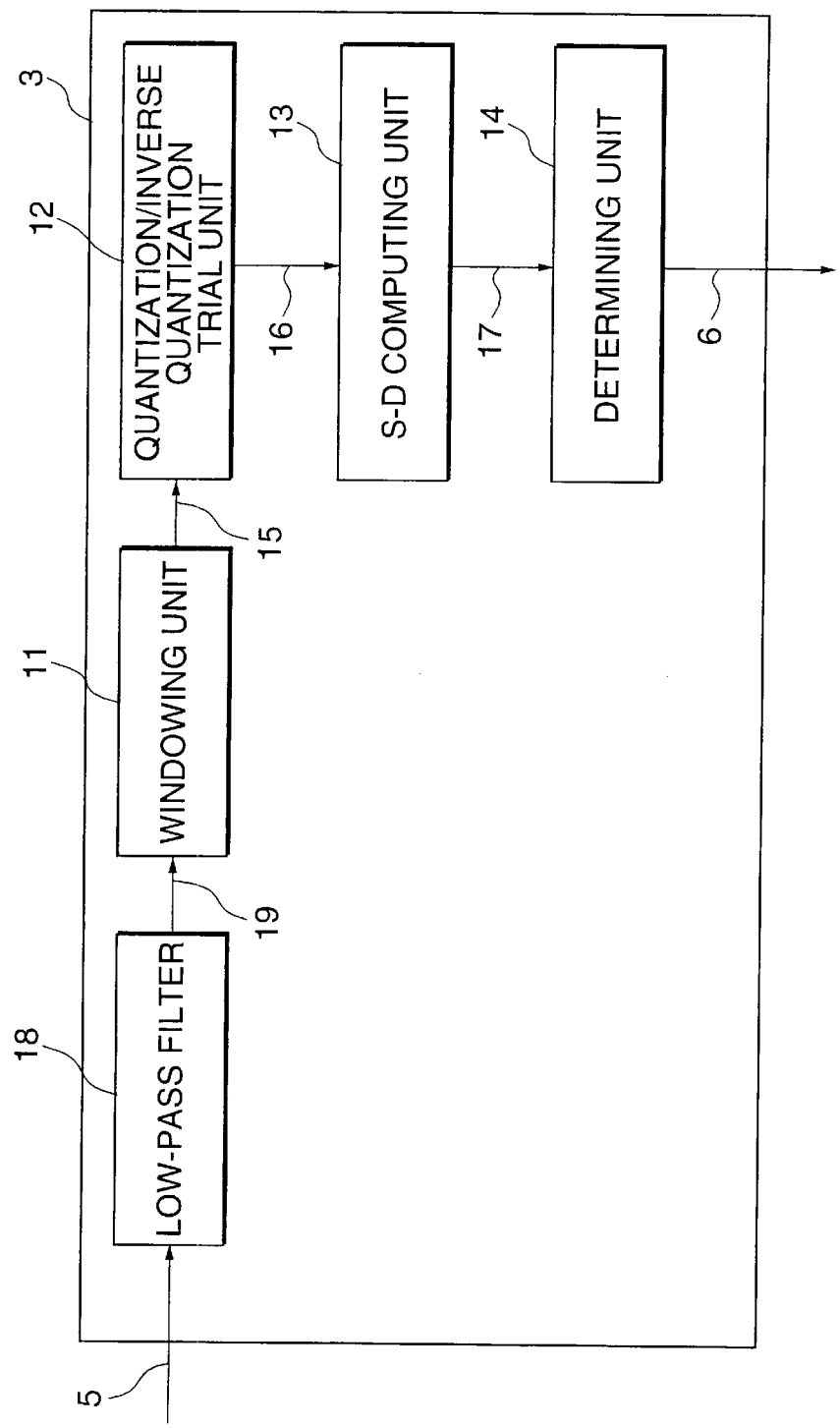
FIG. 8 is a block diagram illustrating another configuration of the quantization characteristics determining unit 3 of FIG. 1.

A case is supposed here in which high-frequency noise is superposed over the input pixel value data 5. It is further supposed that, because the space frequency of the noise is relatively high, the noise is difficult to visually detect. If, then, the same pixel values occur consecutively as a result of quantization or inverse quantization, though it is visually undetectable, S is shortened actually under the impact of the high-frequency noise. As a result, it becomes impossible to accurately predict pseudo-contour generation. To solve this problem, as shown in FIG. 8, the quantization characteristics determining unit 3 is provided with a low pass filter 18 and, after removing the high-frequency noise with this low pass filter 18, the rest of the processing may be carried out.

Figure 5:
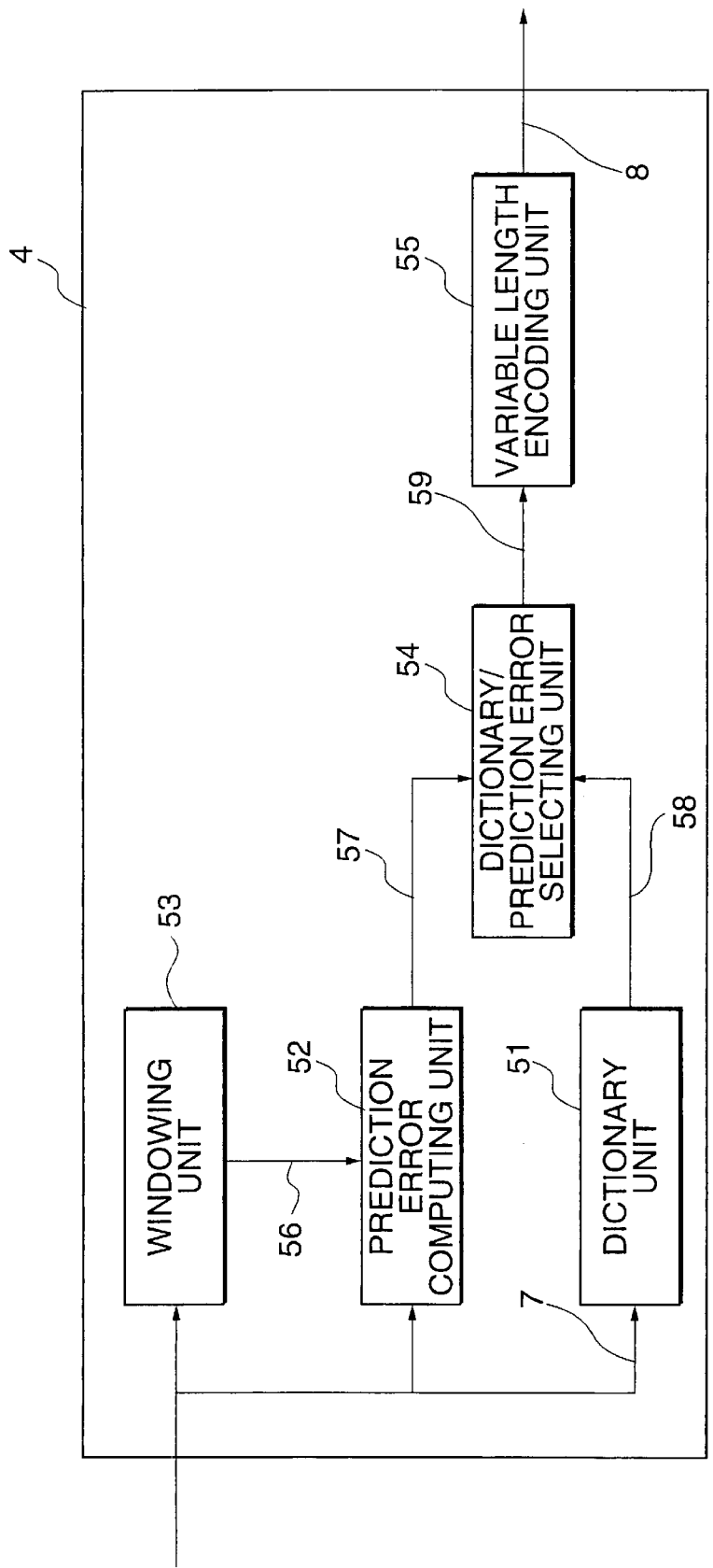
FIG. 5 is a block diagram illustrating the configuration of the entropy encoding unit 4 of FIG. 1.

Next will be described the entropy encoding unit 4 for gray-scale-restricted images. FIG. 5 illustrates the entropy encoding unit 4 having a configuration involving the addition of a dictionary for conventional predictive encoding. In this diagram, the entropy encoding unit 4 includes a dictionary unit 51, a prediction error computing unit 52, a windowing unit 53, dictionary/prediction error selecting unit 54 and a variable-length encoding unit 55.

The windowing unit 53 holds gray-scale-restricted pixel values 7, selects the values 56 of reference pixels peripheral to the pixel to be encoded out of the held pixel values, and outputs them. The prediction error computing unit 52 computes the predicted value of the pixel to be encoded from the values 56 of the reference pixels on the basis of the prediction formula, and computes the difference between the pixel value of the pixel to be encoded and the predicted value as a prediction error 57. The dictionary unit 51 stores gray-scale-restricted pixel values 7 in a dictionary and, if the pixel value of the pixel to be encoded hits an entry in the dictionary, outputs that dictionary index 58 or, if no entry is hit, outputs to a signal line 58 identifying information indicating the failure to hit, and updates the dictionary appropriately. The selecting unit 54, if the signal line 58 is the dictionary index 58, selects it or, if it is identifying information indicating the failure to hit, selects the prediction error 57 and outputs it to a signal line 59. The variable-length encoding unit 55 subjects the dictionary index 58 or the prediction error 57 to variable-length encoding, and outputs the resultant code 8.

Figure 6:
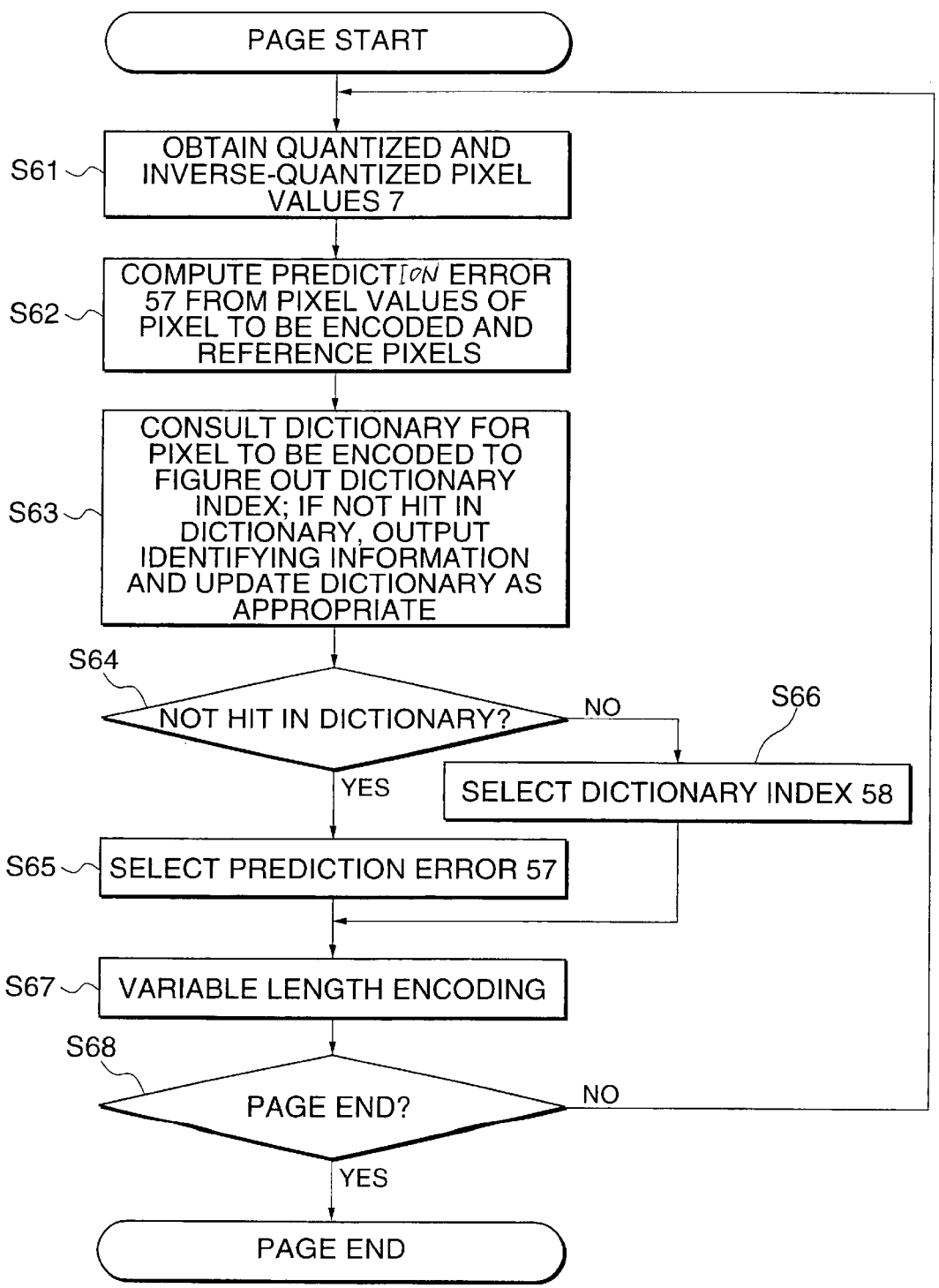
FIG. 6 is a flowchart showing how the entropy encoding unit 4 of FIG. 1 operates.

FIG. 6 shows how the entropy encoding unit 4 operates, and its details are described below.

[Step 61]: Acquires quantized or inverse quantized pixel values 7.
[Step 62]: Computes the prediction error 57 from the pixel value of the pixel to be encoded and that of the reference pixel.
[Step 63]: Consults the dictionary for the pixel to be encoded to find out the dictionary index. If no entry is hit, identifying information is outputted, and the dictionary is updated appropriately.
[Step 64]: If no entry is hit in the dictionary, the process goes ahead to step 65 or, if any is hit, it goes on to step 66.
[Step 65]: Selects the prediction error 57.
[Step 66]: Selects the dictionary index 58.
[Step 67]: Subjects the selected prediction error 57 or the dictionary index 58 to variable-length encoding.
[Step 68]: Repeats steps 61 through 68 until the page end.

Figure 7:
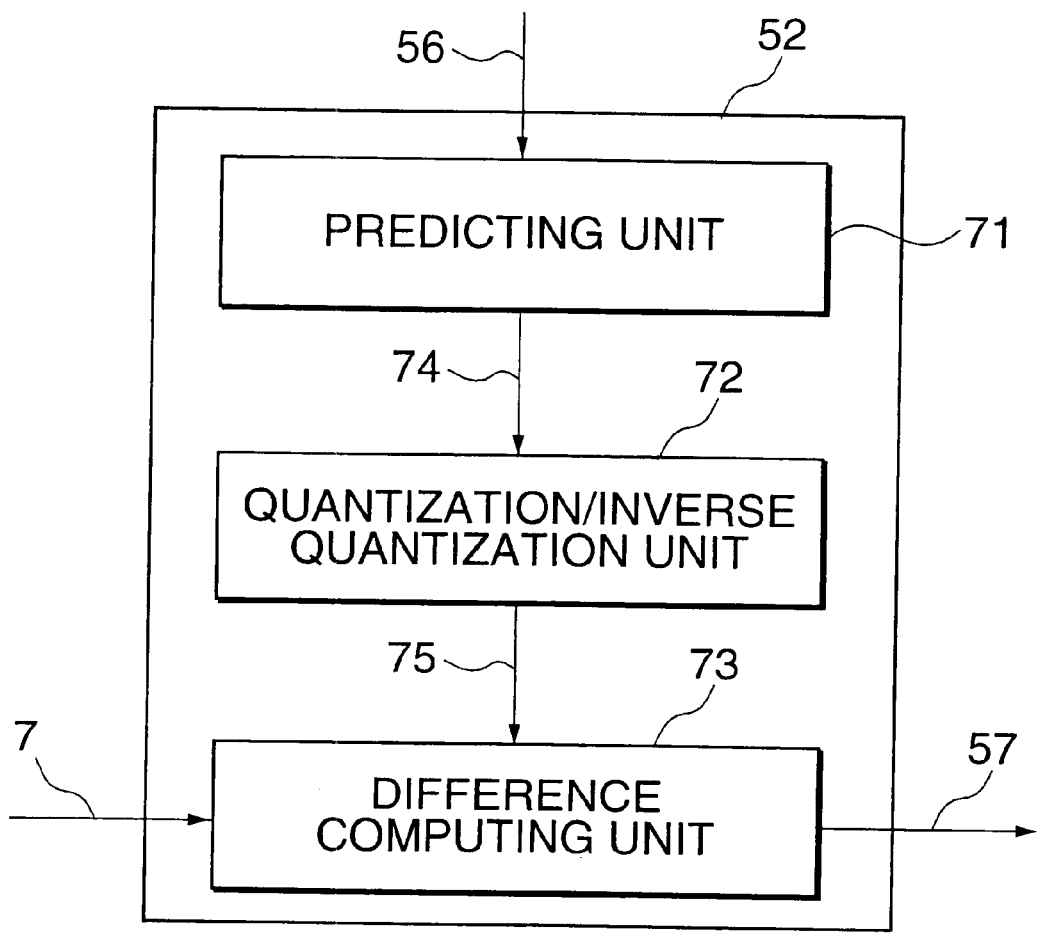
FIG. 7 is a block diagram illustrating the configuration of the prediction error computing unit 52 of FIG. 5.

Next the configuration of the prediction error computing unit 52 including a conventional predictor for predictive encoding augmented with quantization or inverse quantization is illustrated in FIG. 7, wherein the prediction error computing unit 52 includes a predicting unit 71, a quantization/inverse quantization unit 72 and a difference computing unit 73.

The predicting unit 71 computes a predicted value 74 from the values 56 of the reference pixels. The quantization/inverse quantization unit 72 quantizes or inverse quantizes the predicted value 74 according to preset quantization characteristics. The difference computing unit 73 computes the difference between the quantized or inverse quantized predicted value 75 and the pixel value 7 of the pixel to be encoded.

Next will be described a specific example of the configuration of essential parts of the embodiment described above. First, a typical configuration of the quantization/ inverse quantization unit 2 will be described.

The method of quantization used here will be one of simple linear quantization to be described below. Processing to figure out a quantization index I by quantizing the input pixel value x of m [bits] in gray-scale accuracy into n [bits] in gray-scale accuracy is represented by an equation $I=x/2^{(m-n)}$. Next, the inverse quantized pixel value being represented by $\underline{x}$, inverse quantization processing is represented by $\underline{x}=2^{(m-n)}+I/2^{(n-(m-n))}$. It is supposed $n \geq m/2$. As expansion to $n<m/2$ would be easy, its detailed description is dispensed with here.

Figure 9:
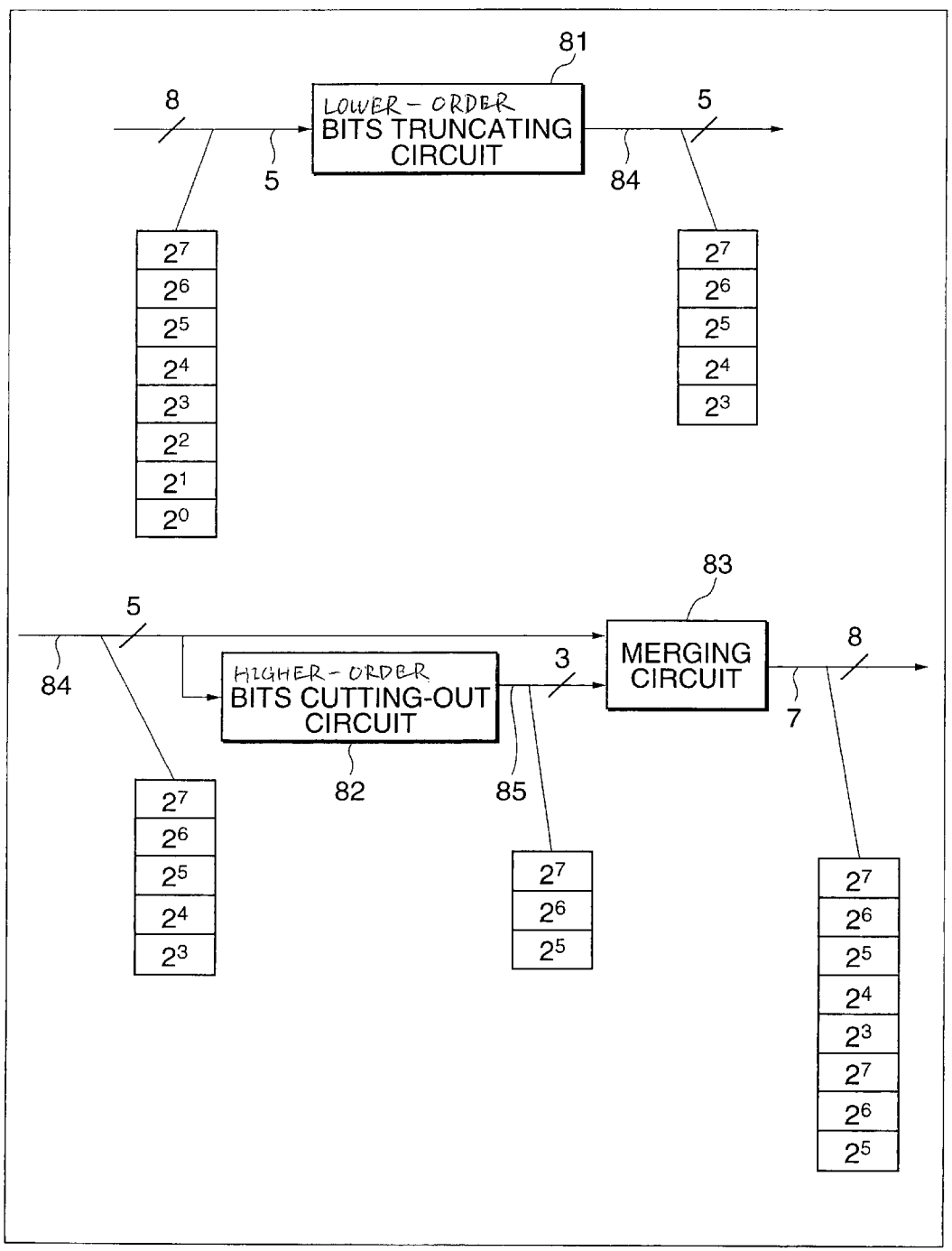
FIG. 9 is a block diagram illustrating a form of realizing the quantization/inverse quantization unit 2 of FIG. 1.

Thus, quantization can be achieved by the simple process of merely truncating the lower-order (m−n)[bits] of the input pixel value x in a binary expression. On the other hand, for inverse quantization, the quantization index I can be used as the higher-order data of the inverse quantized pixel value $\underline{x}$ and the higher-order (m−n)[bits] of the index I can be cut out to be used as the lower-order data of the inverse quantized pixel value $\underline{x}$. In other words, the quantization/inverse quantization unit 2 may output data of n higher-order bits of an m-bit pixel value as a quantization index, or may output the data of the n higher-order bits of an m-bit pixel value as quantization index and data of lower order m−n bits of the inversely quantized value following the n higher-order bits. FIG. 9 illustrates a circuit configuration for use in the case of m=8, n=5. Incidentally, in FIG. 9, reference numeral 81 denotes a lower-order bits truncating circuit for truncating the lower-order 3 [bits]; 82, a higher-order bits cutting-out circuit for cutting out the higher-order 3 [bits]; and 83, a merging circuit.

Figure 10:
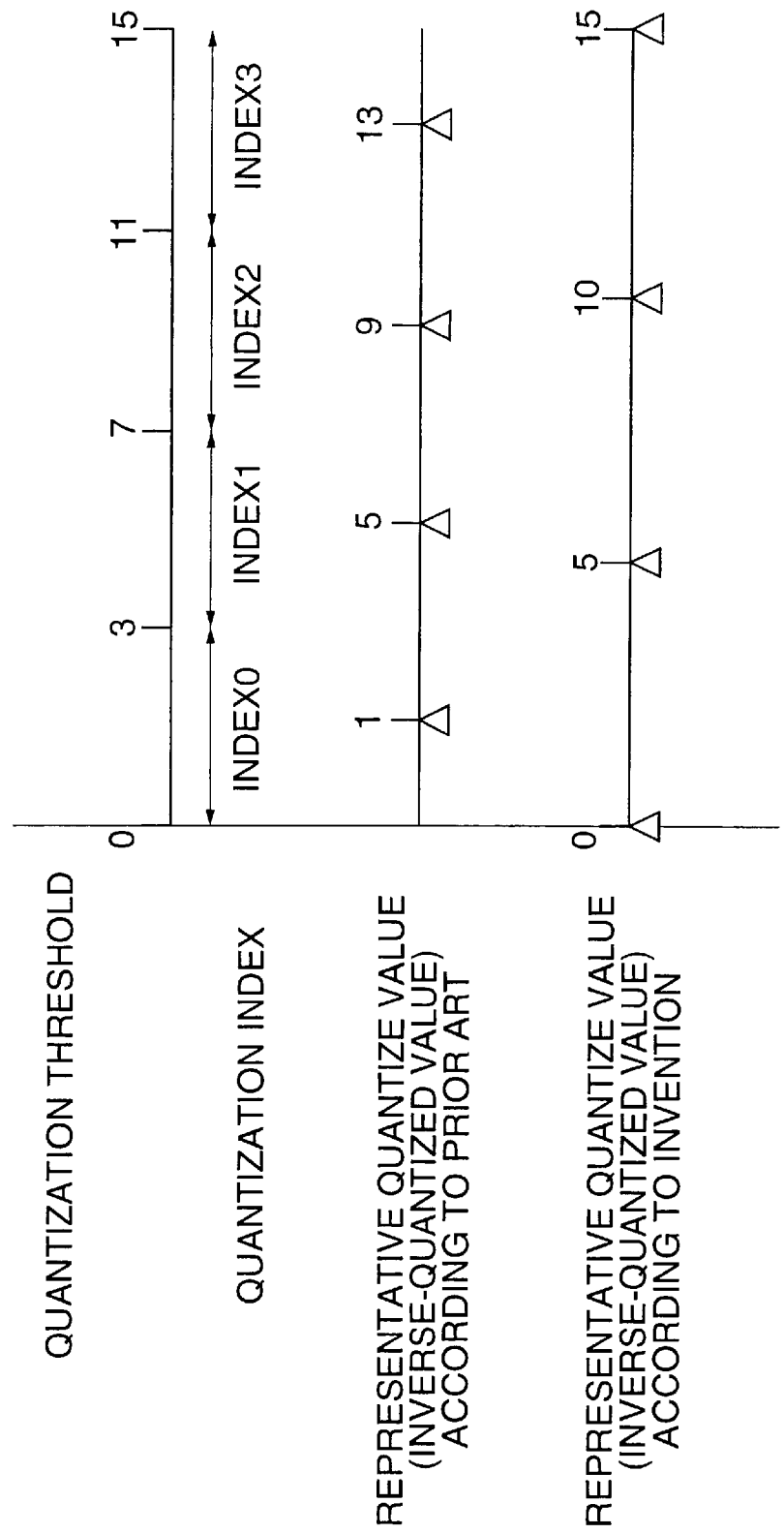
FIG. 10 is a diagram for describing a form of realizing the quantization/inverse quantization unit of FIG. 9.

Such a quantization method provides high image quality, as it imposes little processing load and preserves a wide enough dynamic range of pixel values. Conventional quantization methods entailed large hardware dimensions because they required division or a table of matching between input pixel values and quantization indexes. Furthermore, as illustrated in FIG. 10, since conventional inverse quantization results in a compressed dynamic range, the image quality could be deteriorated by a darkened highlight part of the image or an insufficient density in dark parts. The above-described quantization method is not susceptible to such image quality deterioration because the highest and the lowest of the pixel values are preserved.

In the above-described quantization method, the quantization gray-scale accuracy n [bits] is the only quantization characteristic.

To add, the form of realizing the quantization/inverse quantization unit 2 is not restricted to the above-described method. It may be a conventional quantization technique. Further, as the quantization/inverse quantization unit 2 is essentially intended to restrict the number of gray-scale levels or of pixel values that are used, some other method to limit the number of pixel values (e.g. a color-restricted) may as well be used.

Next will be described a specific example of the configuration of the quantization characteristics determining unit 3.

First, the form of mounting the windowing unit 11 of the quantization characteristics determining unit 3 will be described.

Figures 11, 12:
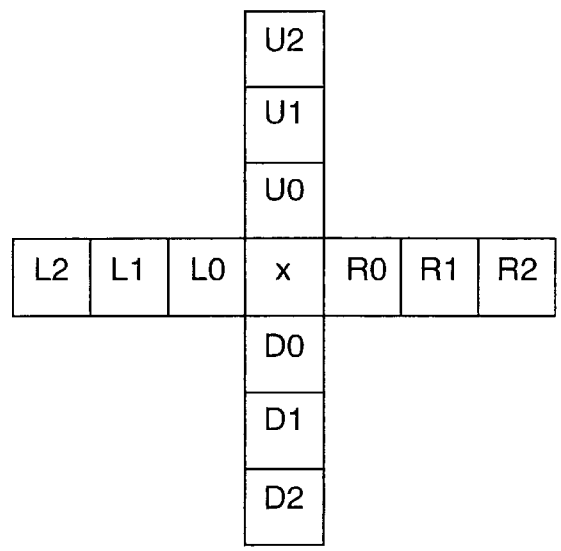
FIG. 11 is a table for describing the result of sensory evaluation of pseudo-contours.
FIG. 12 is a diagram for describing a form of realizing the windowing unit 11 of the quantization characteristics determining unit 3 of FIG. 3.

When counting the length S of the consecutive occurrence of the same pixel values as a result of quantization or inverse-quantization or the pixel value differences D between the pixel to be encoded and the peripheral pixels, the values of S and D are measured in two directions, the main scanning and sub-scanning directions, and the smaller ones are adopted. For this, the windowing unit 11 of FIG. 3 may include a circuit for selecting outputting pixel values positioned in a cross shape with the pixel to be encoded at the center. The window will be large enough if it permits counting up to a value of S where pseudo-contours are generated. An instance in which S and D are figured out by a function evaluation test is shown in FIG. 11. In FIG. 11, "PRESENT" means that a pseudo-contour arises at the corresponding values of S and D. In this example, as a pseudo-contour arises at S>4, the window dimensions will be large enough if they are seven pixels high and wide as illustrated in FIG. 12. In the diagram, the pixel to be encoded is represented by x, and pixels peripheral to it are denoted by U0, U1, U2, L0, L1, L2, D0, D1, D2, R0, R1 and R2.

The quantization/inverse quantization trial unit 12 of the quantization characteristics determining unit 3 may be configured similarly to the mounted form of the quantization/inverse quantization unit 2. In this case, predetermined values of quantization characteristics are used. Pixel values in the windows shown in FIG. 12 are subjected to quantization or inverse quantization.

The S-D computing unit 13 of the quantization characteristics determining unit 3 is so configured as to operate as described below.

Regarding the values resulting from the quantization or inverse quantization of the pixel values in the windows shown in FIG. 12, the number of the consecutive same pixel values as the pixel value of the pixel to be encoded are counted in the main scanning direction, i.e. horizontally, and in the sub-scanning direction, i.e. vertically, and the resultant counts are represented by $RL_M$ and $RL_S$, respectively. Next, the smaller of $RL_M$ and $RL_S$ is chosen as S.

Further regarding the values resulting from the quantization or inverse quantization of the pixel values in the windows shown in FIG. 12, the pixel values following in the vertical and horizontal directions are checked, beginning with the pixel to be encoded, and differences from the pixel values where the same pixel values are no longer consecutive are found out, and represented by $G_U$, $G_L$, $G_D$ and $G_R$. Then, the smallest value of $G_U$, $G_L$, $G_D$ and $G_R$ is chosen as D. If the same pixel values are found consecutively until the edges of the window are reached, the difference from the pixel value is supposed to be 2. This processing supposes that, in view of the pseudo-contour generation at S>4 irrespective of the value D as shown in FIG. 11, that the value of D is the smallest.

The determining unit 14 of the quantization characteristics determining unit 3 has the following configuration, which represents the simplest form of mounting. It is supposed that there are only two kinds of quantization characteristics, of which one is preservation of the original pixel values, i.e. no quantization is carried out. For instance, if an input pixel value x of m=8 [bits] in gray-scale accuracy is to be quantized into n [bits] in gray-scale accuracy, the quantization characteristics are supposed to be n=5 and n=8. The quantization characteristic of n=5 is subjected to quantization or inverse quantization by the quantization/inverse quantization trial unit 12, and only S is counted. The gray-scale gap emerging from the quantization of the quantization characteristic n=5 is $2^{(8-5)}=8$. FIG. 11 reveals that, if D=8, a pseudo-contour arises at S>4. Therefore, it is determined that the quantization characteristics n=8 when S>4 and the quantization characteristics n=5 in any other instance.

Figure 13:
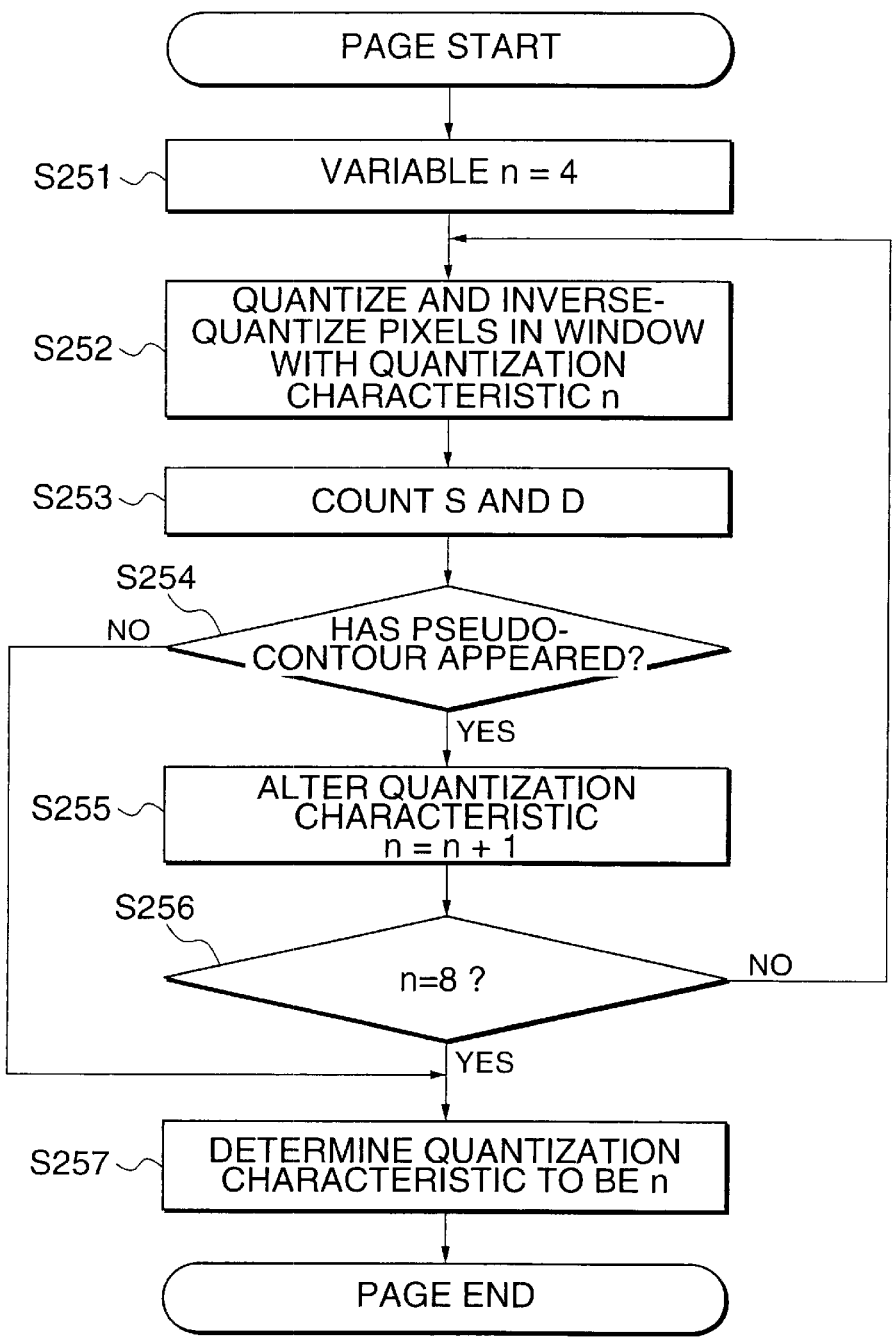
FIG. 13 is a flowchart for describing a form of realizing the quantization characteristics determining unit 3 of FIG. 3.

Next, FIG. 13 illustrates a case in which, in the same form of mounting, the value of D is also taken into consideration in determining the quantization characteristics. There are supposed to be five kinds of quantization characteristics, from n=5 to n=8. First, the quantization characteristics being supposed to be n=4, it is judged if quantization is possible without inviting pseudo-contour generation. If it is possible, the quantization characteristic is determined to be n=4. Otherwise, similar processing is carried out with the quantization characteristic determined to be n=5. After that, similar processing is carried out with the quantization characteristics being varied sequentially. If quantization is impossible without pseudo-contour generation even if the quantization characteristic is n=7, the quantization characteristic is determined to be n=8.

The operation shown in FIG. 13 is as follows.

[Step 251]: Variable n=4.
[Step 252]: Subjects the pixel values of the pixels in the window to quantization or inverse quantization with the quantization characteristics n.
[Step 253]: Counts S and D.
[Step 254]: Judges whether or not pseudo-contour generation will occur. If judged it will, the process goes ahead to step 255. If judged it will not, the process goes on to step 257.
[Step 255]: Updates the quantization characteristics n to n=n+1.
[Step 256]: Judges if n=8 holds. If n=8 holds, the process moves ahead to step 257, or if not, the process returns to step 252.
[Step 257]: Determines the quantization characteristic to be n.

Next will be described an example of the configuration of the entropy encoding unit 4 in specific terms. First a form of realizing the windowing unit 53 of the entropy encoding unit 4 will be described.

In conventional predictive encoding, already encoded pixels are predicted with reference to pixels peripheral to the pixel to be encoded. FIG. 14 illustrates an example of window. In the figure, the pixel to be encoded is represented by x, and the reference pixels, by a, b, c and d. As the encoding takes place in the sequences of scanning, from right to left and from top to bottom, the encoding of a, b, c and d is completed by the time the pixel x is to be encoded. Therefore, when the pixel x is to be encoded in the processing of encoding, the encoding of a, b, c and d is already completed, and accordingly, the values of the reference pixels can be made definite.

Next will be described a form of realizing the prediction error computing unit 52 of the entropy encoding unit 4.

In predictive encoding according to the present invention, the predicted value 74 of the pixel to be encoded is computed by the prediction formula from the pixel values 56 of the reference pixels in the window; this predicted value is subjected to quantization or inverse quantization with preset quantization characteristics; the obtained value is made a new predicted value 75; and the prediction error 57 is computed by subtracting the predicted value 75 from the pixel value 7 of the pixel to be encoded. For instance, the prediction formula for the window in FIG. 14 is supposed to be $\underline{x}=(2a+2b-c-d)/2$. Here the form of mounting for the quantization/inverse quantization unit 72 in FIG. 7 is the same as that for the quantization/inverse quantization unit 2. For example, in the form of mounting for the quantization characteristics determining unit 3, if there are only two kinds of quantization characteristics, and the input pixel value x of m=4 [bits] in gray-scale accuracy is to be quantized to n [bits] in gray-scale accuracy, quantization characteristics are supposed to be n=2 and n=3. In this case, the pixel x to be encoded, as shown in FIG. 15, is subjected to quantization or inverse quantization with characteristics resulting from the synthesis of two kinds of quantization characteristics. Such quantization characteristics can be realized by comparing the quantization error resulting from the quantization or inverse quantization of the prediction error 74 with quantization characteristics n=2 and that with quantization characteristics n=3, and carrying out quantization or inverse quantization with what gave a smaller quantization error.

In order to realize the invention illustrated in FIG. 1, the available form of realizing the prediction error computing unit 52 is not limited to the above-described. The method that is applied need not involve the conventional prediction error computing method, i.e. it need not include quantization or inverse quantization of the predicted value.

Next will be described the form of realizing the dictionary unit 51 of the entropy encoding unit 4.

Figure 16A:
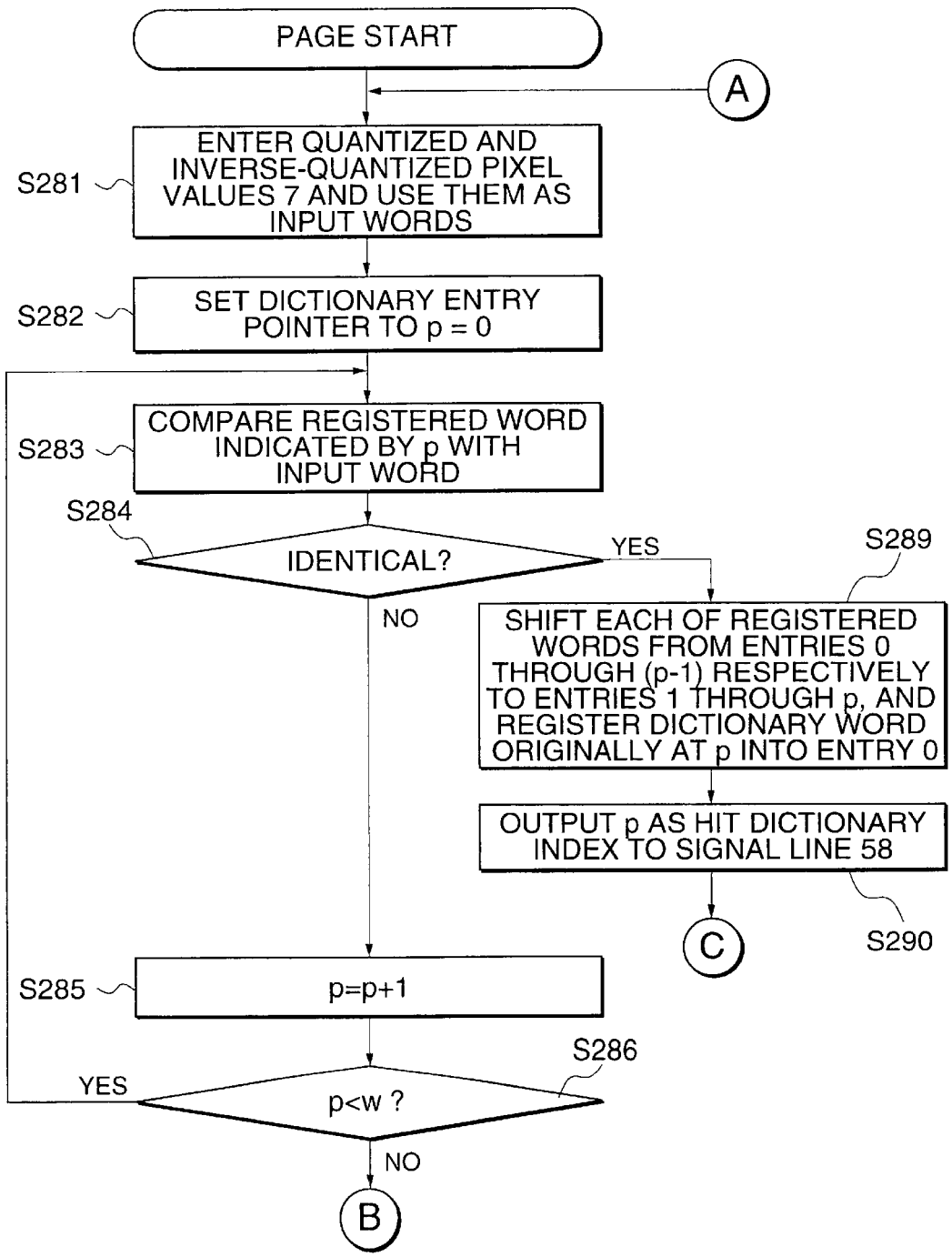
FIGS. 16A and 16B are flowcharts for describing a form of realizing the dictionary unit 51 of the entropy encoding unit of FIG. 5.
Figure 16B:
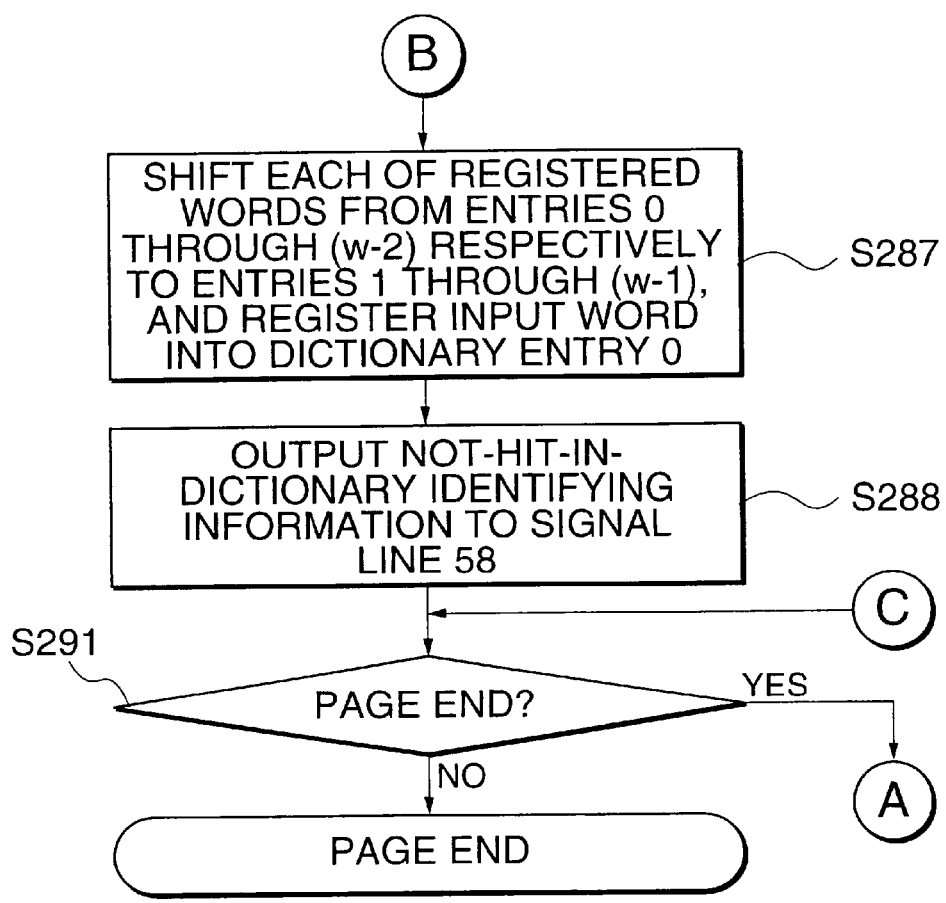

As a dictionary type encoding technique, the simple type of dictionary having fixed pixel values as words will be adopted. The operation that takes place when the number of entries in the dictionary is w is illustrated in FIGS. 16A and 16B. As the vocabulary size is fixed, it can be realized by simpler processing than the conventional LZ77 system (Lempel-Ziv, "A Universal Algorithm for Sequential Data," *IEEE Transactions on Information Theory*, 1977) or LZ78 system, wherein the vocabulary size varies adaptively.

As shown in FIGS. 16A and 16B, the dictionary unit 51 operates as follows.

[Step 281]: Enters the pixel value 7 having gone through quantization or inverse quantization for use as an input word.

[Step 282]: The entry pointer of dictionary is supposed to be p=0.

[Step 283]: Compares registered word denoted by p and the input word.

[Step 284]: If they are found identical, the process goes ahead to step 289 or, if not, to step 285.

[Step 285]: p=p+1 is supposed.

[Step 286]: Judges if p<w holds. If p<w holds, the process returns to step 283, and the previous processing is repeated, or if p=w holds, the process moves on to step 287.

[Step 287]: Shifts each of the registered words from the entries 0 through (w−2) respectively to the entries 1 through (w−1), and registers the input word into the dictionary entry 0.

[Step 288]: Outputs identifying information indicating failure to hit an entry in the dictionary to the signal line 58.

[Step 289]: Shifts each of the registered words from the entries 0 through (p−1) respectively to the entries 1 through p, and registers the dictionary word originally at p into that entry.

[Step 290]: Outputs p to the signal line 58 as a hit dictionary index.

[Step 291]: Repeats the above-described processing until the page end.

Incidentally, in order to implement the invention illustrated in FIG. 1, the form of realizing the dictionary unit 51 is not limited to the foregoing. A conventional technique may be used as well.

Next will be described the dictionary /prediction error selecting unit 54 of the entropy encoding unit 4.

The dictionary/prediction error selecting unit 54 can be realized with a selector which, if the content on the signal line 58 is a dictionary index, outputs this to the signal line 59 or, if the content on the signal line 58, is identifying information indicating the failure to hit any entry in the dictionary, outputs to the signal line 59 the prediction error entered from the signal line 57.

Next will be described a form of realizing the variable-length encoding unit 55 of the entropy encoding unit 4. The variable-length encoding unit 55 can be realized with a circuit which subjects the dictionary index entered from the signal line 59 or the prediction error value to variable-length encoding. A variable-length encoding method used, for example, in the conventional JPEG independent system would suffice.

Figures 17, 18:
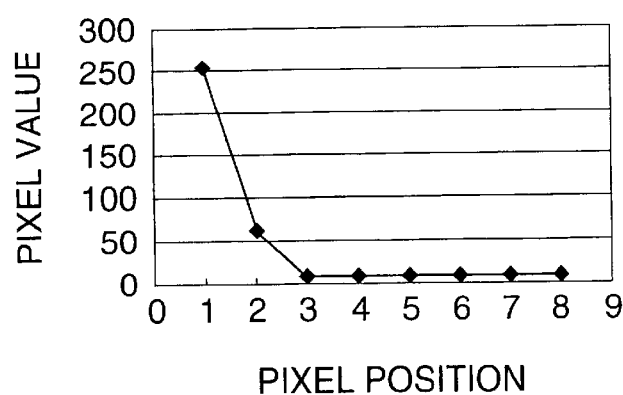
FIG. 17 is a diagram for describing a form of realizing the low pass filter 18 of the quantization characteristics determining unit 3 of FIG. 8.
FIG. 18 is a graph for describing the density profile of an input image in connection with pseudo-contour generation.
Figure 19:
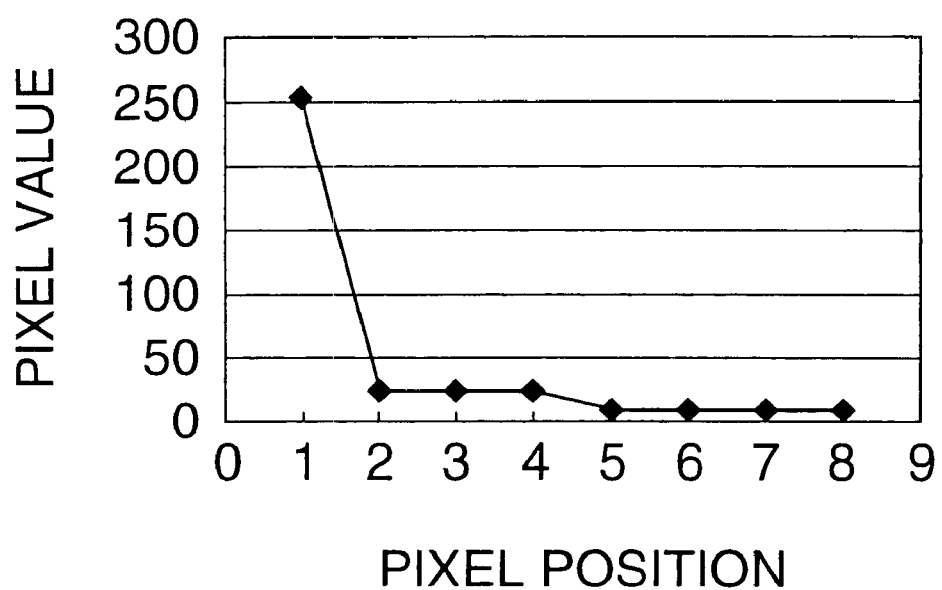
FIG. 19 is a graph for describing the density profile of an output image in connection with pseudo-contour generation.
Figure 20:
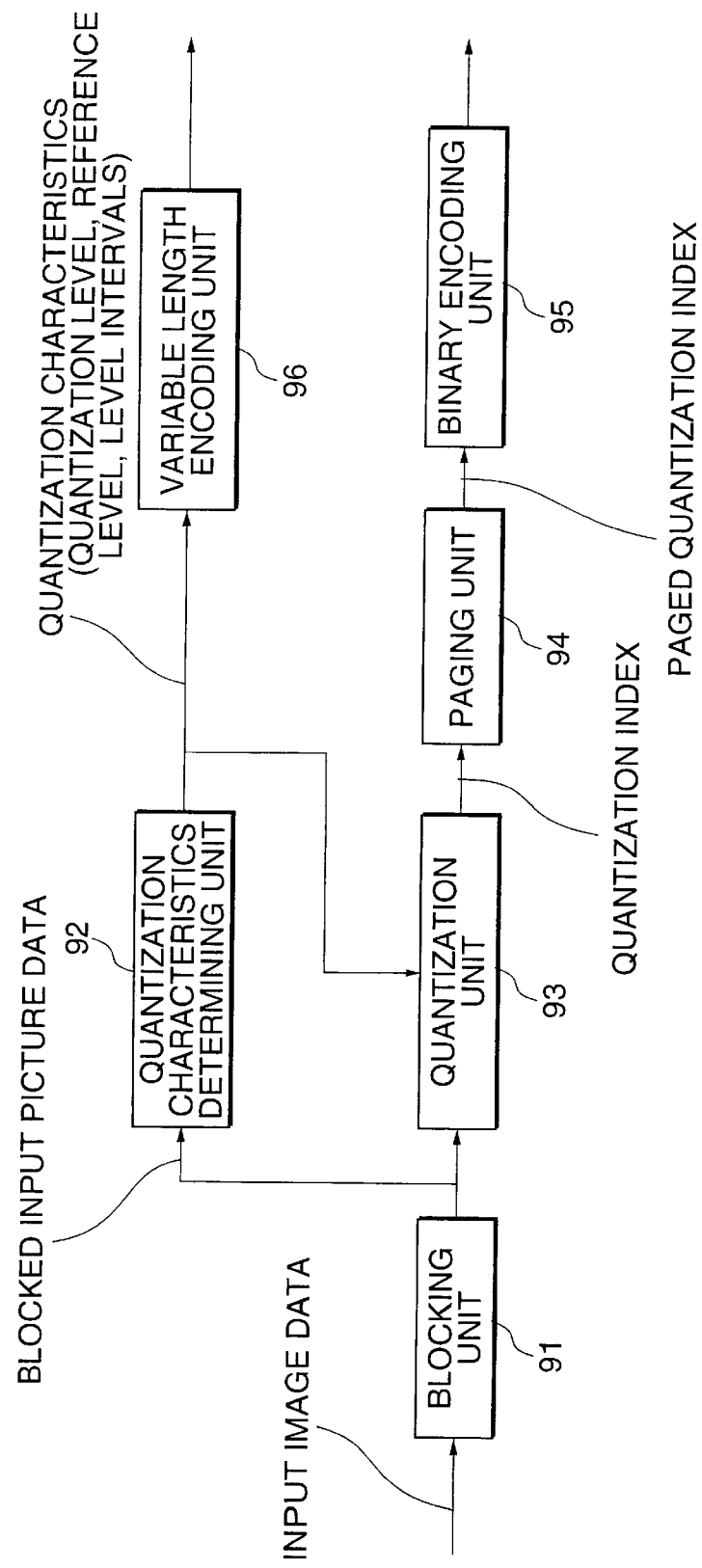
FIG. 20 is a block diagram illustrating BTC system encoding according to the prior art.

Now will be described a form of realizing the low pass filter 18 of the quantization characteristics determining unit 3 shown in FIG. 8. It may be realized with a two-dimensional low pass filter having a coefficient shown, for instance, in FIG. 17. Where the filter output value is represented by f, the value of the pixel to be encoded by $x_{0,0}$, and the values of pixels peripheral to it by $x_{i,j}$, i={−1, 0, 1} and j={−1, 0, 1}, $f = \frac{1}{16} \cdot \Sigma\Sigma s_{i,j} \times x_{i,j}$ holds. Here, $s_{i,j}$ is a filter coefficient shown in FIG. 17. This processing, wherein every coefficient used is a power of 2, requires neither multiplication nor division, but can be realized solely by arithmetic shifting, addition and subtraction, resulting in a relatively light processing load.

Next will be described the advantages of this embodiment of the invention.

1. Since this embodiment requires no frequency conversion processing such as DCT, it is subject to no heavy processing load. Furthermore, as it involves no switching of quantization characteristics on a block-by-block basis unlike the BTC system, it gives rise to no block distortion. Furthermore, since it does not encode the quantization index and quantization characteristics on separate lines as the BTC system does, its hardware composition is simple.

The processing load on this embodiment is roughly compared here with that on the JPEG system. Addition and subtraction, logic operation, access to pixel values and access to intermediate results are all treated as a single instruction, while multiplication and division are treated as four instructions. The JPEG system, in which DCT operation is the heaviest, has an overall load of 134 instructions per pixel. According to the present invention, the processing to count RL and G by windowing on a pixel-by-pixel basis is the heaviest, and the overall load is 17 instructions per pixel. Even if processing by the low-pass filtering is added, the per-pixel load is no more than 26 instructions.

2. As the probability of pseudo-contour generation is assessed in advance by sensory evaluation of the image pattern most susceptible to pseudo-contour generation (a stress pattern in which uniform stripes are arranged), and the level of pseudo-contour occurrence is accurately predicted according to the relative similarity of an input image to the stress pattern, quantization can be accomplished at the smallest number of gray-scale levels within an extent in which pseudo-contour generation is absent. This results in a high level of encoding efficiency.

Pseudo-contour generation can be accurately suppressed by simple processing, as the stress pattern is parameterized as to the stripe width S and the differences D among individual stripes in pixel value, and the degree of similarity is assessed using as coefficients the number RL of the consecutive same pixel values in the input image as the pixel value of the pixel to be encoded and the pixel values G between the run (a cluster of consecutive pixels of the same pixel value) containing the pixel to be encoded and adjoining pixels and according to the relative magnitudes if S, D, RL and G By using the coefficient of RL after removing high-frequency noise with the low-pass filter, inconsistency between the visually detected run length and RL is prevented, with the result that pseudo-contour generation can be accurately suppressed even if high-frequency noise is superposed over the input image data.

3. By switching the quantization characteristics on a pixel-by-pixel basis and subjecting to entropy encoding pixel values having gone through quantization or inverse quantization, there is no need to encode the quantization characteristics as additional information, resulting in a high level of encoding efficiency.

As a combination of predictive encoding and dictionary encoding is used as entropy encoding, image data whose number of gray-scale levels is restricted by quantization or inverse quantization can be efficiently encoded.

As the predictor for predictive encoding subjects predicted values computed by a prediction formula to quantization or inverse quantization, image data restricted in the number of gray-scale levels can be efficiently encoded.

By providing a diction having a fixed vocabulary of pixel values as dictionary encoding, image data restricted in the number of gray-scale levels can be efficiently encoded by simple processing.

The encoding apparatus embodied as described makes possible, where for example one page of data is transferred from a client to a print server via a network to be printed, image encoding can be accomplished at relatively high speed without having to use any special hardware on the part of the client.

To add, the encoding apparatus in the above-described embodiment may as well be executed by a processing program which is stored in the memory of a general-purpose personal computer. The processing program may be stored in any of various optical disks including, for instance, a CD-ROM, DVD-ROM, CO-R, CO-RW or DVD-RAM. It may also be stored on a magnetic disk such as a hard disk or a floppy disk. It may as well be stored in a semiconductor memory or a tape medium such as a DAT or an 8-mm tape.

At any rate, the processing program can be read out for execution from a program medium to supply the processing program to execute the above-described processing either directly or indirectly via a network.

To add, a conventional entropy decoding apparatus can be used as it is as the decoding apparatus for this arrangement.

As hitherto described, according to the present invention, image data can be encoded with a simple hardware configuration and without having to bear a heavy processing load. Furthermore, no block distortion will occur, and images can be encoded at a high efficiency without inviting deterioration of image quality by pseudo-contour generation. In addition, the quantization characteristics can be accurately determined with a simple configuration.

What is claimed is:

1. A quantization characteristics determining apparatus comprising:
   a unit that selects values of pixels peripheral to a pixel to be encoded out of input pixel values and outputs them;
   a unit that quantizes the values of the peripheral pixels and inversely quantizes the quantized value of the peripheral pixels according to preset quantization characteristics;
   a unit that measures the length of consecutive occurrence of the same pixel values from the quantized and inverse quantized pixel values and/or pixel value differences between the pixel to be encoded and the peripheral pixels; and
   a unit that determines quantization characteristics from the measured length and/or the pixel value differences.

2. A quantization characteristics determining apparatus, as claimed in claim 1, wherein the input pixel values are preprocessed by a low-pass filter.

3. A quantization characteristics determining apparatus, as claimed in claim 1, wherein the relationship of a length and/or the pixel value differences, both figured out in advance by a sensory evaluation test, to the frequency of pseudo-contour generation is held, and the quantization characteristics are determined from comparison of the measured length and/or the of pixel value differences.

4. An image encoding apparatus comprising:
   a unit that inputs pixel values;
   a unit that determines quantization characteristics on a pixel-by-pixel basis according to the characteristics of the input pixel values;
   a unit that quantizes the values of the input pixel values and inversely quantizes the quantized input pixel values according to the determined quantization characteristics; and
   a unit that subjects gray-scale-restricted image data by quantization and inverse quantization to entropy encoding.

5. An image encoding apparatus, as claimed in claim 4, wherein
   the entropy encoding unit comprises:
   a unit that selects gray-scale-restricted values of reference pixels peripheral to a pixel to be encoded and outputs them;
   a unit that computes a predicted value of the pixel to be encoded from the values of the reference pixels on the basis of a prediction formula, and computes as a prediction error any difference between the quantized/inversely quantized value of the pixel to be encoded and the predicted value thereof; and
   a variable-length encoding unit that subjects the prediction error to variable-length encoding to output a resultant code.

6. An image encoding apparatus, as claimed in claim 4, wherein
   the entropy encoding unit comprises:
   a unit that selects the gray-scale-restricted values of reference pixels peripheral to a pixel to be encoded and outputs them;
   a unit that computes a predicted value of the pixel to be encoded from the values of the reference pixels on the basis of a prediction formula, and computes as a prediction error any difference between the quantized/inversely quantized value of the pixel to be encoded and the predicted value thereof;
   a dictionary encoding unit that stores gray-scale-restricted pixel values in a dictionary, and outputs, if the quantized/inversely quantized value of the pixel to be encoded hits any entry in the dictionary, an index of the dictionary entry, or outputs, if no entry is hit, identifying information indicating the failure to hit and updates the dictionary appropriately;
   a selecting unit that selects and outputs the dictionary index if any entry in the dictionary is hit or, if no entry is hit, selects and outputs the prediction error; and
   a variable-length encoding unit that subjects the prediction error to variable-length encoding to output a resultant code.

7. An image encoding apparatus, as claimed in claim 5, wherein
   the unit that computes a predicted value comprises:
   a prediction unit that computes the predicted value from the value of the reference pixel;
   a unit that quantizes the predicted value and inverse quantizes the quantized value according to preset quantization characteristics; and
   a prediction error computing unit that computes difference between the quantized/inverse quantized predicted value and the quantized/inverse quantized value of the pixel to be encoded.

8. An image encoding apparatus, as claimed in claim 6, wherein
   the unit that computes a predicted value comprises:
   a prediction unit that computes the predicted value from the value of the reference pixel;
   a unit that quantizes the predicted value and inverse quantizes the quantized value according to preset quantization characteristics; and
   a prediction error computing unit that computes difference between the quantized/inverse quantized predicted value and the quantized/inverse quantized value of the pixel to be encoded.

9. An image encoding apparatus, as claimed in claim 4, wherein the unit that quantizes/inverse quantizes the input pixel values outputs data of n higher-order bits of an m-bit pixel value as a quantization index, or outputs the data of the n higher-order bits of an m-bit pixel value as a quantization index and data of lower order m−n bits of the inversely quantized value following the n higher-order bits.

10. An image encoding apparatus comprising:

a unit that inputs pixel values;

a unit that determines characteristics of restricting the number of pixel values on a pixel-by-pixel basis according to the characteristics of the input pixel values;

a unit that converts the input pixel values into output pixel values according to the determined characteristics of restricting the number of pixel values; and a unit that subjects image data restricted in the number of pixel values by the characteristics of restricting the number of pixel values to entropy encoding.

11. A computer-readable recording medium recording a program of instructions for causing a computer to execute a function for encoding, the function comprising the steps of:

generating data by quantizing values of a pixel to be encoded and pixels peripheral thereto with preset quantization characteristics;

measuring a length of the consecutive occurrence, in the peripheral pixels, of the same data as the quantized data of the value of the pixel to be encoded and/or the differences between the values of the pixel to be encoded and the peripheral pixels;

determining the quantization characteristics of the values of the pixel to be encoded from the measured length and/or the pixel value differences D; and quantizing the value of the pixel to be encoded according to the determined quantization characteristics.

* * * * *